United States Patent
Nakayama et al.

(10) Patent No.: US 10,850,476 B2
(45) Date of Patent: Dec. 1, 2020

(54) INTERLAYER FOR LAMINATED GLASS, LAMINATED GLASS, AND PRODUCTION METHOD FOR INTERLAYER FOR LAMINATED GLASS

(71) Applicant: SEKISUI CHEMICAL CO., LTD., Osaka (JP)

(72) Inventors: Kazuhiko Nakayama, Shiga (JP); Hiroshi Kawate, Shiga (JP); Koji Kido, Shiga (JP); Michiko Mori, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 629 days.

(21) Appl. No.: 15/551,631

(22) PCT Filed: Apr. 8, 2016

(86) PCT No.: PCT/JP2016/061548
§ 371 (c)(1),
(2) Date: Aug. 17, 2017

(87) PCT Pub. No.: WO2016/163519
PCT Pub. Date: Oct. 13, 2016

(65) Prior Publication Data
US 2018/0022058 A1  Jan. 25, 2018

(30) Foreign Application Priority Data
Apr. 10, 2015 (JP) .................. 2015-081179

(51) Int. Cl.
*B32B 3/30* (2006.01)
*B29C 59/04* (2006.01)
(Continued)

(52) U.S. Cl.
CPC ............ *B32B 3/30* (2013.01); *B29C 59/04* (2013.01); *B32B 17/10587* (2013.01);
(Continued)

(58) Field of Classification Search
CPC ........ B32B 17/10568; B32B 17/10577; B32B 17/10587; B32B 17/10596
See application file for complete search history.

(56) References Cited

U.S. PATENT DOCUMENTS

| | | |
|---|---|---|
| 5,455,103 A | 10/1995 | Hoagland et al. |
| 6,093,471 A | 7/2000 | Hopfe et al. |

(Continued)

FOREIGN PATENT DOCUMENTS

| | | |
|---|---|---|
| CN | 102782860 | 11/2012 |
| EP | 1 233 007 | 8/2002 |

(Continued)

OTHER PUBLICATIONS

Extended European Search Report dated Nov. 23, 2018 in European Patent Application No. 16776685.6.
(Continued)

*Primary Examiner* — David Sample
(74) *Attorney, Agent, or Firm* — Wenderoth, Lind & Ponack, L.L.P.

(57) ABSTRACT

The present invention provides an interlayer film for a laminated glass which is easily peelable without autohesion even after storage in a stacked state, a laminated glass prepared using the interlayer film for a laminated glass, and a method for producing the interlayer film for a laminated glass. The present invention provides an interlayer film for a laminated glass, having a large number of recesses on at least one surface, the at least one surface having the recesses having an arithmetical mean height Sa of 200 nm or more as measured in conformity with ISO 25178.

14 Claims, 3 Drawing Sheets

(51) Int. Cl.
  *B32B 17/10* (2006.01)
  *B29C 48/08* (2019.01)
  *B29C 48/88* (2019.01)
  *B29K 29/00* (2006.01)

(52) U.S. Cl.
  CPC ........ *B32B 17/10761* (2013.01); *B29C 48/08* (2019.02); *B29C 48/919* (2019.02); *B29K 2029/14* (2013.01)

(56) References Cited

U.S. PATENT DOCUMENTS

| | | | |
|---|---|---|---|
| 10,532,541 B2 * | 1/2020 | Nakayama | B32B 17/10825 |
| 2014/0302281 A1 * | 10/2014 | Yacovone | B32B 17/10587 |
| | | | 428/141 |
| 2015/0174862 A1 | 6/2015 | Kitano et al. | |
| 2016/0101602 A1 | 4/2016 | Kitano et al. | |
| 2016/0129674 A1 | 5/2016 | Kitano et al. | |
| 2016/0151995 A1 | 6/2016 | Kitano et al. | |
| 2016/0151996 A1 | 6/2016 | Kitano et al. | |

FOREIGN PATENT DOCUMENTS

| | | |
|---|---|---|
| EP | 2 933 272 | 10/2015 |
| JP | 61-154919 | 7/1986 |
| JP | 8-26789 | 1/1996 |
| JP | 9-508078 | 8/1997 |
| JP | 9-295839 | 11/1997 |
| JP | 2001-261385 | 9/2001 |
| JP | 2002-104846 | 4/2002 |
| JP | 2002-154156 | 5/2002 |
| JP | 2003-48762 | 2/2003 |
| JP | 2003-128442 | 5/2003 |
| JP | 2003-528749 | 9/2003 |
| JP | 2010-523379 | 7/2010 |
| JP | 2011-88783 | 5/2011 |
| JP | 2013-10671 | 1/2013 |
| RU | 68504 | 11/2007 |
| TW | 201350321 | 12/2013 |
| TW | 201437243 | 10/2014 |
| WO | 95/19885 | 7/1995 |
| WO | 2008/128003 | 10/2008 |
| WO | 2014/021459 | 2/2014 |
| WO | 2015/016358 | 2/2015 |
| WO | 2015/016361 | 2/2015 |
| WO | 2015/016365 | 2/2015 |
| WO | 2015/016366 | 2/2015 |

OTHER PUBLICATIONS

Communication pursuant to Article 94(3) EPC dated Dec. 17, 2019 in corresponding European Patent Application No. 16776685.6.
International Search Report dated Jun. 14, 2016 in International (PCT) Application No. PCT/JP2016/061548.
Communication pursuant to Article 94(3) EPC dated Jun. 15, 2020 in corresponding European Patent Application No. 16 776 685.6.

* cited by examiner (a)

(b)

INTERLAYER FOR LAMINATED GLASS, LAMINATED GLASS, AND PRODUCTION METHOD FOR INTERLAYER FOR LAMINATED GLASS

TECHNICAL FIELD

The present invention relates to an interlayer film for a laminated glass which is easily peelable without autohesion even after storage in a stacked state, a laminated glass prepared using the interlayer film for a laminated glass, and a method for producing the interlayer film for a laminated glass.

BACKGROUND ART

A laminated glass including two glass plates integrated through an interlayer film for a laminated glass containing plasticized polyvinyl butyral is widely used, particularly, for vehicle windshields.

In the process for producing a laminated glass, deaeration properties upon stacking a glass plate and an interlayer film for a laminated glass on top of each other is important. The interlayer film for a laminated glass therefore commonly has a large number of recesses formed on at least one surface for the purpose of ensuring the deaeration properties in production of a laminated glass. In particular, when the recesses each have a groove shape with a continuous bottom and such recesses in the shape of engraved lines are regularly adjacent and parallel to each other, excellent deaeration properties can be exhibited.

In a method for producing a laminated glass, for example, an interlayer film for a laminated glass unwound from a rolled body is cut into an appropriate size, and the resulting interlayer film for a laminated glass is sandwiched between at least two glass plates. The obtained laminate is placed in a rubber bag and vacuum suctioned for removal of air remaining between the glass plates and the interlayer film so as to be preliminarily pressure bonded. Then, the laminate is pressurized with heat, for example, in an autoclave for final pressure bonding (e.g., Patent Literature 1).

In such a method for producing a laminated glass, interlayer films for a laminated glass cut into a predetermined shape in advance are stacked and stored in a constant temperature and humidity room for efficient production. However, the stacked interlayer films for a laminated glass adhere to each other (autohesion) during storage and, disadvantageously, cannot be peeled by a machine transporting interlayer films for a laminated glass or by human power.

CITATION LIST

Patent Literature

Patent Literature 1: JP H08-26789 A

SUMMARY OF INVENTION

Technical Problem

In light of the circumstances, the present invention aims to provide an interlayer film for a laminated glass which is easily peelable without autohesion even after storage in a stacked state, a laminated glass prepared using the interlayer film for a laminated glass, and a method for producing the interlayer film for a laminated glass.

Solution to Problem

The present invention relates to an interlayer film for a laminated glass, having a large number of recesses on at least one surface, the at least one surface having the recesses having an arithmetical mean height Sa of 200 nm or more as measured in conformity with ISO 25178.

The present invention is described in detail below.

The interlayer film for a laminated glass of the present invention has a large number of recesses on at least one surface. With this structure, deaeration properties during production of a laminated glass can be ensured.

The interlayer film for a laminated glass of the present invention may have the recesses only on one surface or both surfaces. Preferably, the recesses are formed on both surfaces to exhibit excellent deaeration properties during the production of the laminated glass.

The surface having the recesses has an arithmetical mean height Sa of 200 nm or more as measured in conformity with ISO 25178.

The Sa is calculated after processing of an image of the interlayer film surface obtained using a three-dimensional white light interference microscope to remove coarse protrusions and recesses, and is a three-dimensional shape parameter indicating an in-plane arithmetic average height. Namely, Sa is a parameter indicating a pattern of fine protrusions and recesses except for large protrusions and recesses (hereinafter such a pattern of fine protrusions and recesses is also referred to as "first shape" to distinguish from a pattern of large protrusions and recesses described later). As a result of extensive studies, the inventors of the present invention found that the adhesion force (autohesion) between the interlayer films for a laminated glass after storage in a stacked state is largely affected by the Sa value of the surfaces of these interlayer films for a laminated glass. As a result of further extensive studies, the inventors found that when the pattern of protrusions and recesses on the surface of each interlayer film for a laminated glass is controlled such that the Sa value is 200 nm or more, the resulting interlayer films are easily peelable without autohesion even after storage in a stacked state. The present invention was thus completed.

When the first shape on the surface of the interlayer film for a laminated glass is controlled such that the Sa value is 200 nm or more, the resulting interlayer films are easily peelable without autohesion even after storage in a stacked state. The lower limit of the Sa value is 250 nm, more preferably 400 nm.

The upper limit of the Sa value is not particularly limited. Yet, a practical upper limit is about 3,000 nm to ensure deformation of the protrusions and recesses when the interlayer film is sandwiched between at least two glass plates to be pressure-bonded during the production of a laminated glass.

When the recesses are formed on both surfaces, although it suffices as long as the Sa value of one of the surfaces is 200 nm or more, it is preferred that the Sa value is 200 nm or more on both surfaces to further reduce autohesion of the films after storage in a stacked state.

Specifically, the Sa value can be measured by, for example, the following method.

Specifically, the surface of the interlayer film for a laminated glass is measured using a three-dimensional white light interference microscope (e.g., ContourGT-K available from Bruker AXS GmbH) in a 1 mm square field of view at an objective lens magnification of 115 times, an internal lens magnification of 0.5 times, and a resolution set to Full resolution to obtain images. In this operation, the light quantity and threshold are set as appropriate so as to minimize noise in the measurement. The obtained images are subjected to planarization and noise removal processes, and coarse protrusions and recesses are removed using a Gaussian filter. Then, the arithmetical mean height Sa value is calculated by a method specified by ISO 25178. Analytical software "Vision64" included in the apparatus was used in image processing. Conditions for the planarization and noise removal processes involve performing the first processing "Terms Removal (F-Operator)" on Analysis Toolbox under the analysis condition "Tilt only (Plane Fit)", performing the second processing "Statistic Filter" under the analysis conditions "Filter type: Sigma" and "Filter size: 5", and further performing the processing "data Restore" by selecting the analysis condition "Legacy", selecting Restore Edge condition, and setting Iteration condition to a value for sufficient data complement. In order to remove coarse protrusions and recesses, the third processing "Gaussian Regression Filter" was performed under the analysis conditions "Short wavelength pass, order: 2, Type: Regular, and Long wavelength cutoff: 0.025 mm", and advance setup is performed under initial conditions. The image data after the first processing through the third processing is subjected to the fourth processing "S parameters-height" under the analysis condition "Removal tilt: True". The resulting "Sa" is used as the arithmetical mean height Sa value. Nine points in a 10 cm square sample of the interlayer film for a laminated glass are measured such that these points are 3 cm or more distant from each other. The average of the measurement values was used as the Sa value.

The surface having the recesses preferably has a ten-point average roughness Rz of 10 μm or more as measured in conformity with JIS B 0601 (1994). With this structure, the adhesion force (autohesion force) between the interlayer films for a laminated glass can be further reduced when the interlayer film for a laminated glass is stored in a stacked state. The lower limit of the Rz value is more preferably 15 μm, still more preferably 20 μm.

The upper limit of the Rz value is not particularly limited. In order to reliably deform protrusions and recesses upon pressure bonding of an interlayer film for a laminated glass sandwiched between at least two glass plates, the upper limit is substantially 70 μm or less. The upper limit is preferably 50 μm or less to allow easier pressure bonding.

The Rz can be measured, for example, by data processing of digital signals measured using a surface roughness measuring instrument (e.g., SE1700α available from Kosaka Laboratory Ltd.).

The first shape may be formed by any method, such as an embossing roll method, calendar roll method, profile extrusion method, or extrusion lip embossing method which takes advantage of melt fracture. The first shape having a desired Sa value (and a desired Rz value) can be easily formed particularly by the following Production Example 1 or Production Example 2.

Production Example 1 is an embossing roll method in which an embossing roll produced by a specific production method is used. Specifically, it is a method for forming the first shape on a surface of the interlayer film for a laminated glass using an embossing roll produced by a production process including a step of forming protrusions and recesses on a metal roll by blasting with an abrasive material (embossing roll production step 1), a step of grinding a portion of each protrusion on the metal roll having the protrusions and recesses into a flat surface portion (embossing roll production step 2), and a step of forming protrusions and recesses on the metal roll by blasting with an abrasive material finer than the abrasive material used in the embossing roll production step 1 (embossing roll production step 3).

The metal roll to be used in the embossing roll production step 1 is made of a metal such as iron, carbon steel, alloy steel, nickel-chromium steel, or chromium steel. In particular, a metal roll made of carbon steel or alloy steel is preferred because it exhibits excellent durability.

In the embossing roll production step 1, a surface of the metal roll is blasted with an abrasive material such as aluminum oxide or silicon oxide to form protrusions and recesses on the surface of the metal roll. The abrasive material is particularly preferably aluminum oxide.

The abrasive material to be used in the embossing roll production step 1 preferably has a grain size of F20 to F120, more preferably F30 to F80 specified in JIS R6001 (1998). In the embossing roll production step 1, blasting is performed until desired roughness is obtained, usually at a discharge pressure of $40 \times 10^4$ to $15 \times 10^5$ Pa.

In the embossing roll production step 2, a portion of each protrusion on the metal roll having the protrusions and recesses formed in the embossing roll production step 1 is ground (i.e., partial grinding) into a flat surface portion. In other words, partial grinding is performed to uniformly grind an upper portion of each protrusion formed on the surface of the metal roll into a flat surface portion. Thus, excessively large protrusions on the surface of the metal roll can be eliminated.

Usually, aluminum oxide or silicon carbide of F200 to F220 or #240 to #2000, preferably #400 to #1000 specified in JIS, can be used as a grinding stone for partial grinding in the embossing roll production step 2. Alternatively, sandpaper can be used as a grinding stone.

In the embossing roll production step 3, protrusions and recesses are formed by blasting with an abrasive material finer than the abrasive material used in the embossing roll production step 1.

In the embossing roll production step 3, blasting is performed with an abrasive material such as aluminum oxide or silicon oxide.

In the embossing roll production step 3, blasting is performed usually at a discharge pressure of $40 \times 10^4$ to $15 \times 10^5$ Pa.

The abrasive material to be used in the embossing roll production step 3 preferably has a grain size of F150 to F360 or #240 to #700, more preferably F220 or #240 to #400 specified in JIS R6001 (1998). A desired Sa value can be obtained with the use of the abrasive material having such a grain size.

The abrasive material to be used in the embossing roll production step 3 preferably has a grain diameter at a cumulative height of 3% in conformity with JIS R6001 (1998) of 150 μm or less, more preferably 120 μm or less, still more preferably 103 μm or less. When the grain diameter at a cumulative height of 3% is in the above preferred range, the protrusions and recesses to be formed on a ground portion of the roll can be made fine, and the resulting interlayer film for a laminated glass can be prevented from having an excessively high Sa value.

In addition, the abrasive material to be used in the embossing roll production step 3 preferably has a grain diameter at a cumulative height of 94% in conformity with JIS R6001 (1998) of 11 μm or more, more preferably 20 μm or more. When the grain diameter at a cumulative height of 94% is in the above preferred range, the protrusions and recesses to be formed on the ground portion of the roll can be made to a certain size or larger. Thus, the resulting interlayer film for a laminated glass has a high Sa value.

Preferably, the abrasive material to be used in the embossing roll production step 3 has a grain diameter at a cumulative height of 3% in conformity with JIS R6001 (1998) in the above preferred range, and a grain diameter at a cumulative height of 94% in conformity with JIS R6001 (1998) in the above preferred range.

The grain size, the grain diameter at a cumulative height of 3%, and the grain diameter at a cumulative height of 94% are preferably measured by an electrical resistance test method.

The embossing roll may be metal-plated for rust proofing. Chemical plating is particularly preferred for obtaining a uniform plating thickness.

In Production Example 1, the first shape is formed on a surface of the interlayer film for a laminated glass by the embossing roll method, using the embossing roll produced by the above production method.

Conditions for the embossing roll method may be as follows: a film temperature of 80° C., an embossing roll temperature of 145° C., a linear velocity of 10 m/min, and a linear pressure of 1 to 100 kN/m.

Production Example 2 is an embossing method in which melt fracture phenomena are controlled. This method adjusts the cooling rate of a resin composition for forming an interlayer film for a laminated glass when it is extruded from a die into an interlayer film for a laminated glass. In the embossing method in which melt fracture phenomena are controlled, a film extruded from a die is cooled in a cooling water tank. During cooling, the cooling rate of the film is adjusted so as to control the Sa value (and the Rz value) of the first shape to be formed. Specifically, for example, the distance between the die and the cooling water tank is shortened to increase the cooling rate so as to increase the Sa value (and Rz value), whereby the first shape having a desired Sa value (and a desired Rz value) can be formed. The distance between the die and the cooling water tank is preferably 250 mm or less, more preferably 200 mm or less, still more preferably 100 mm or less, most preferably 50 mm or less.

Preferred ranges of other conditions for film formation in Production Example 2 are as follows: an extrusion amount per die width of 100 to 700 kg/hr·m, a temperature of the film surface immediately after being extruded from the die of 140° C. to 260° C., a resin pressure at the die inlet of 30 to 160 kgf/cm$^2$, and a water temperature in the water tank for cooling the film of 20° C. to 30° C. The conditions are controlled to obtain a desired extrusion amount and a desired Rz value.

Preferably, the interlayer film for a laminated glass of the present invention further has recesses (hereinafter also referred to as "second shape") larger than the fine recesses of the first shape. Because of the formation of the second shape, the interlayer film can exhibit further improved deaeration properties during the production of the laminated glass. In addition, since the contact area between the films during storage in stacked state will be reduced, so that autohesion can be further prevented.

The recesses of the second shape may be of any shape as long as they each have a shape with a continuous bottom (groove shape). For example, the shape of the recesses may be one that is commonly formed on a surface of an interlayer film for a laminated glass, such as a shape of an engraved line or a grid pattern (e.g., blockish pattern, spherical pattern). The protrusions may have a shape transferred from an embossing roll.

The recesses of the second shape each have a groove shape with a continuous bottom, and adjacent recesses are regularly parallel to each other (hereinafter, also referred to as "in the shape of engraved lines"). Commonly, ease of deaeration upon pressure bonding of a laminate including an interlayer film for a laminated glass interposed between two glass plates closely relates to the continuousness and smoothness of the bottoms of the recesses. When the recesses are in the shape of engraved lines, the continuousness of the bottoms is further improved to markedly increase the deaeration properties.

The term "regularly parallel" means that adjacent recesses each having the groove shape mentioned above may be parallel to each other at equal intervals, or adjacent recesses in the shape of engraved lines are parallel to each other, but all of adjacent recesses in the shape of engraved lines are not necessarily parallel to each other at equal intervals. In addition, the grooves do not necessarily have a straight line shape and may be in the shape of, for example, a wave or zigzag, as long as the recesses are regularly adjacent and parallel to each other.

FIG. 1 and FIG. 2 each show a schematic view of an exemplary interlayer film for a laminated glass, in which recesses each having a groove shape are parallel to each other at equal intervals. FIG. 3 shows a schematic view of an exemplary interlayer film for a laminated glass, in which recesses each having a groove shape are parallel to each other at unequal intervals. In FIG. 3, an interval A between a recess 1 and a recess 2 is different from an interval B between a recess 1 and a recess 3.

Further, FIG. 4 shows a schematic view of an exemplary interlayer film for a laminated glass, having a blockish pattern on a surface. FIG. 5 shows a schematic view of an exemplary interlayer film for a laminated glass, having a spherical pattern on a surface.

The lower limit of the roughness (Rz) of the recesses of the second shape is preferably 10 µm, whereas the upper limit thereof is preferably 75 µm. When the roughness (Rz) is 10 µm or more, very excellent deaeration properties can be exhibited. When the roughness (Rz) is 75 µm or less, the recesses are easily deformed when the interlayer film is sandwiched between two glass plates to be pressure-bonded. Thus, the pressure bonding can be performed at a lower temperature. The lower limit of the roughness (Rz) is more preferably 15 µm, and the upper limit thereof is more preferably 50 µm. The lower limit thereof is still more preferably 25 µm, and the upper limit thereof is still more preferably 40 µm.

For the roughness (Rz) of the recesses herein, the ten-point average roughness (Rz) on both surfaces of the obtained interlayer film was measured by the method in conformity with JIS B 0601 (1994) as specified in JIS B 0601 (1994), "Surface roughness—definition and indications". For example, the measuring instrument used was "Surfcorder SE300" available from Kosaka Laboratory Ltd. The measurement was performed using a stylus profilometer at a cut-off value of 2.5 mm, a standard length of 2.5 mm, an evaluation length of 12.5 mm, and a measurement rate of 0.5 mm/s, with a stylus having a tip radius of 2 µm and a tip angle of 60°. The measurement environment was 23° C. and 30 RH %. The stylus was moved in a direction perpendicular to the direction of the grooves in the shape of engraved lines.

When the recesses of the second shape each have a groove shape with a continuous bottom and are regularly adjacent and parallel to each other, an interval Sm between the recesses in the shape of engraved lines is preferably 400 µm or less, more preferably 200 μm or less, still more preferably 150 μm or less. The lower limit is preferably 80 μm.

The interval Sm between the recesses may be measured by the following method, for example. Specifically, an optical microscope (e.g., DSX-100 available from Olympus Corporation) is used to observe a surface of the interlayer film for a laminated glass (observation range: 4 mm×4 mm), and the shortest distance between deepest bottoms of adjacent recesses is measured for every pair of adjacent recesses observed. Then, the measured shortest distances are averaged to obtain the interval between the recesses. The maximum of the measured shortest distances may be regarded as the interval of the recesses. The interval between the recesses may be the average shortest distance or the maximum shortest distance, but the average shortest distance is preferred. The measurement environment is 23° C. and 30 RH %.

FIG. 6(a) shows a schematic view explaining an interval Sm between recesses. In FIG. 6(a), protrusions and recesses 20 on the first surface or the second surface include recesses 21 each having a groove shape with a continuous bottom and protrusions 22. The interval Sm refers to the interval between the recesses 21.

When the recesses of the second shape each have a groove shape with a continuous bottom and are regularly adjacent and parallel to each other and when the recesses of the second shape are formed on both surfaces of an interlayer film for a laminated glass, an intersection angle θ between the recesses each having a groove shape with a continuous bottom on one surface and the recesses each having a groove shape with a continuous bottom on the other surface is preferably 10° or more. In this case, autohesion can be further reduced to provide easy peelability. The intersection angle θ is preferably 20° or more, more preferably 45° or more, particularly preferably 90°.

FIG. 7 shows a schematic view explaining the intersection angle θ. In FIG. 7, an interlayer film 10 for a laminated glass has recesses 11 each having a groove shape with a continuous bottom indicated with solid lines on a first surface and recesses 12 each having a groove shape with a continuous bottom indicated with dotted lines on a second surface. The intersection angle θ is the intersection angle between the recesses 11 each having a groove shape with a continuous bottom indicated with solid lines and the recesses 12 each having a groove shape with a continuous bottom indicated with dotted lines.

For the intersection angle θ, for example, an interlayer film for a laminated glass was visually or optical-microscopically observed to measure the intersection angle θ between the recesses each having a groove shape with a continuous bottom on the first surface and the recesses each having a groove shape with a continuous bottom on the second surface. In the case of visual observation, straight lines were drawn in ink in parallel to the recesses on both surfaces, and an acute angle between the drawn straight lines was measured with a protractor. In the case of optical microscopic observation, an enlarged surface is photographed and an acute angle is measured using image processing software or the like. Thus, the intersection angle θ can be measured.

The protrusions formed correspondingly to the recesses on the second shape each may have a flat top as shown in FIG. 1 or a non-flat top as shown in FIG. 2. In the case where the protrusions each have a flat top, the flat surface of the top may further have fine protrusions and recesses formed thereon.

Further, in the protrusions and recesses, the protrusions may have the same or different heights, and the recesses may have the same or different depths as long as the recesses each have a continuous bottom.

The protrusions each preferably have a radius of rotation R of 200 μm or less, more preferably 100 μm or less, still more preferably 40 μm or less, particularly preferably 25 μm or less. Thus, the adhesion force (autohesion) between the interlayer films for a laminated glass after storage in a stacked state can be further reduced.

The radius of rotation R of the protrusion can be measured as follows. For example, the interlayer film is cut in a direction perpendicular to the recesses in the shape of engraved lines and in the film thickness direction. The cross section is observed using a microscope (e.g., "DSX-100" available from Olympus Corporation) and photographed at a magnification of 277 times. The obtained image is enlarged to 50μ/20 mm. In this state, the radius of an inscribed circle at the apex of a protrusion shape is determined as the radius of rotation of the tip of the protrusion, using measurement software included in accessory software. The measurement environment is 23° C. and 30 RH %.

FIG. 6(b) shows a schematic view explaining the radius of rotation R of a protrusion. In FIG. 6(b), the radius of a circle in contact with a tip of the protrusion 22 is a radius of rotation R of the protrusion.

Preferably, the surface has an arithmetical mean height Sa of 200 nm or more as measured for apexes of the protrusions in conformity with ISO 25178 (hereinafter such an arithmetical mean height is also referred to as "apex Sa").

The apex Sa can be measured specifically by the following method, for example.

Specifically, the surface of the interlayer film for a laminated glass is measured using a three-dimensional white light interference microscope (e.g., ContourGT-K available from Bruker AXS GmbH) in a 1 mm square field of view at an objective lens magnification of 115 times, an internal lens magnification of 0.5 times, and a resolution set to Full resolution to obtain images. In this operation, the light quantity and threshold are set as appropriate so as to minimize noise in the measurement. The obtained images are subjected to planarization and noise removal processes, and further subjected to Maskdata process to extract data on the heights of only the protrusions. Coarse protrusions and recesses are removed from the extracted data region using a Gaussian filter, and the arithmetical mean height Sa is calculated by the method specified in ISO 25178. Analytical software "Vision64" included in the apparatus was used in image processing. Conditions for the planarization and noise removal processes involve performing the first processing "Terms Removal (F-Operator)" on Analysis Toolbox under the analysis condition "Tilt only (Plane Fit)", performing the second processing "Statistic Filter" under the analysis conditions "Filter type: Sigma" and "Filter size: 5", and further performing the processing "data Restore" by selecting the analysis condition "Legacy", selecting Restore Edge condition, and setting Iteration condition to a value for sufficient data complement. In the third processing "Mask data" to extract image data on only the protrusions, the Height threshold of a histogram displayed under the analysis condition Histogram Mask is determined to be between 0.2 and −0.2 μm, and data on height regions equal to or more than the threshold is extracted under the condition "Mask: Left". The successful setting of the threshold to between 0.2 and −0.2 μm was confirmed from the histogram display of the data after the extraction. In order to remove coarse protrusions and recesses, the fourth processing "Gaussian Regression Filter" was performed under the analysis conditions "Short wavelength pass, order: 2, Type: Regular, and Long wavelength cutoff: 0.025 mm", and advance setup was performed under initial conditions. The image data after the first processing through the third processing was subjected to the fourth processing "S parameters-height" under the analysis condition "Removal tilt: True". The resulting "Sa" was used as the arithmetical mean height Sa value. Nine points in a 10 cm square sample of the interlayer film for a laminated glass are measured such that these points are 3 cm or more distant from each other. The average of the measurement values was used as the Sa value.

The measurement environment is 23° C. and 30 RH %.

The method for forming the second shape is not particularly limited, and is performed by, for example, an embossing roll method, a calendar roll method, or a profile extrusion method. In particular, preferred is the embossing roll method because the shape where the recesses in the shape of engraved lines are adjacent and parallel to each other is easily achieved.

The interlayer film for a laminated glass of the present invention may have a single layer structure consisting of one resin layer or a multilayer structure including two or more resin layers laminated together.

In the case of having a multilayer structure, the interlayer film for a laminated glass of the present invention may include, as two or more resin layers mentioned above, a first resin layer and a second resin layer having different characteristics. Such an interlayer film for a laminated glass can have various properties which are hardly achieved by a single layer structure.

The resin layer preferably contains a thermoplastic resin.

Examples of the thermoplastic resin include polyvinylidene fluoride, polytetrafluoroethylene, vinylidene fluoride-propylene hexafluoride copolymers, polyethylene trifluoride, acrylonitrile-butadiene-styrene copolymers, polyester, polyether, polyamide, polycarbonate, polyacrylate, polymethacrylate, polyvinyl chloride, polyethylene, polypropylene, polystyrene, polyvinyl acetal, and ethylene-vinyl acetate copolymers. In particular, the resin layer preferably contains polyvinyl acetal or an ethylene-vinyl acetate copolymer, more preferably contains polyvinyl acetal.

The polyvinyl acetal can be prepared, for example, by acetalization of polyvinyl alcohol with an aldehyde. The polyvinyl alcohol can be produced, for example, by saponification of polyvinyl acetate. The polyvinyl alcohol commonly has a degree of saponification within a range of 70 to 99.8 mol %.

The polyvinyl alcohol has an average degree of polymerization of preferably 200 or more, more preferably 500 or more, still more preferably 1,700 or more, particularly preferably more than 1,700, and preferably 5,000 or less, more preferably 4,000 or less, still more preferably 3,000 or less, particularly preferably less than 3,000. When the average degree of polymerization is equal to or more than the lower limit, a laminated glass to be obtained has higher penetration resistance. When the average degree of polymerization is equal to or less than the upper limit, formation of an interlayer film is facilitated.

The average degree of polymerization of the polyvinyl alcohol can be obtained by the method in conformity with JIS K6726 "Testing methods for polyvinyl alcohol".

The carbon number of an acetal group contained in the polyvinyl acetal is not particularly limited. The aldehyde for use in production of the polyvinyl acetal is not particularly limited. The lower limit of the carbon number of the acetal group in the polyvinyl acetal is preferably 3, and the upper limit thereof is preferably 6. When the carbon number of the acetal group in the polyvinyl acetal is 3 or more, an interlayer film has a sufficiently low glass transition temperature, and bleeding out of a plasticizer can be prevented. When the carbon number of the aldehyde is 6 or less, synthesis of the polyvinyl acetal can be facilitated to ensure the productivity. The C3-C6 aldehyde may be a linear or branched aldehyde, and examples thereof include n-butyraldehyde and n-valeraldehyde.

The aldehyde is not particularly limited. Commonly, the aldehyde is preferably a C1-C10 aldehyde. Examples of the C1-C10 aldehyde include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, and benzaldehyde. Preferred among these are propionaldehyde, n-butyraldehyde, isobutyraldehyde, n-hexylaldehyde, and n-valeraldehyde, more preferred are propionaldehyde, n-butyraldehyde, and isobutyraldehyde, and still more preferred is n-butyraldehyde. These aldehydes may be used alone or in combination of two or more thereof.

The hydroxy group content of the polyvinyl acetal is preferably 10 mol % or higher, more preferably 15 mol % or higher, still more preferably 18 mol % or higher, and preferably 40 mol % or lower, more preferably 35 mol % or lower. When the hydroxy group content is equal to or more than the lower limit, an interlayer film has a higher adhesion force. When the hydroxy group content is equal to or less than the upper limit, an interlayer film has high flexibility and is easily handled.

The hydroxy group content of the polyvinyl acetal is a value in percentage of the mole fraction obtained by dividing the amount of ethylene groups to which hydroxy groups are bonded by the total amount of ethylene groups of the main chain. The amount of ethylene groups to which hydroxy groups are bonded can be determined, for example, by measurement in conformity with JIS K6726 "Testing methods for polyvinyl alcohol" or in conformity with ASTM D1396-92.

The degree of acetylation (acetyl group content) of the polyvinyl acetal is preferably 0.1 mol % or more, more preferably 0.3 mol % or more, still more preferably 0.5 mol % or more, and preferably 30 mol % or less, more preferably 25 mol % or less, still more preferably 20 mol % or less. When the degree of acetylation is equal to or more than the lower limit, the polyvinyl acetal has high compatibility with a plasticizer. When the degree of acetylation is equal to or less than the upper limit, an interlayer film and a laminated glass to be obtained have high damp resistance.

The degree of acetylation is a value in percentage of the mole fraction obtained by subtracting the amount of ethylene groups to which acetal groups are bonded and the amount of ethylene groups to which hydroxy groups are bonded from the total amount of ethylene groups of the main chain and then dividing the obtained value by the total amount of ethylene groups of the main chain. The amount of ethylene groups to which acetal groups are bonded can be measured, for example, in conformity with JIS K6728 "Testing methods for polyvinyl butyral" or in conformity with ASTM D1396-92:

The degree of acetalization of the polyvinyl acetal (or the degree of butyralization of a polyvinyl butyral resin) is preferably 50 mol % or more, more preferably 53 mol % or more, still more preferably 60 mol % or more, particularly preferably 63 mol % or more, and preferably 85 mol % or less, more preferably 75 mol % or less, still more preferably 70 mol % or less. When the degree of acetalization is equal to or more than the lower limit, the polyvinyl acetal has high compatibility with a plasticizer. When the degree of acetalization is equal to or less than the upper limit, a reaction time necessary for production of the polyvinyl acetal is reduced.

The degree of acetalization is a value in percentage of the mole fraction obtained by dividing the amount of ethylene groups to which acetal groups are bonded by the total amount of ethylene groups of the main chain.

The degree of acetalization can be calculated by measuring the degree of acetylation and the hydroxy group content by the method in conformity with JIS K6728 "Testing methods for polyvinyl butyral" or the method in conformity with ASTM D1396-92, calculating their mole fractions from the obtained measurement results, and subsequently subtracting the mole fractions of the degree of acetylation and the hydroxy group content from 100 mol %.

The hydroxy group content, the degree of acetalization (degree of butyralization), and the degree of acetylation are preferably calculated from results of measurement by the method in conformity with JIS K6728 "Testing methods for polyvinyl butyral". In the case where the polyvinyl acetal is a polyvinyl butyral resin, the hydroxy group content, the degree of acetalization (degree of butyralization), and the degree of acetylation are preferably calculated from results of measurement by the method in conformity with JIS K6728 "Testing methods for polyvinyl butyral".

The resin layer preferably contains polyvinyl acetal and a plasticizer.

Any plasticizer may be used as long as it is commonly used in interlayer films for a laminated glass. Examples thereof include organic plasticizers such as monobasic organic acid esters and polybasic organic acid esters, and phosphoric acid plasticizers such as organophosphate compounds and organophosphite compounds.

Examples of the organic plasticizers include triethylene glycol-di-2-ethylhexanoate, triethylene glycol-di-2-ethylbutyrate, triethylene glycol-di-n-heptanoate, tetraethylene glycol-di-2-ethylhexanoate, tetraethylene glycol-di-2-ethylbutyrate, tetraethylene glycol-di-n-heptanoate, diethylene glycol-di-2-ethylhexanoate, diethylene glycol-di-2-ethylbutyrate, and diethylene glycol-di-n-heptanoate. Among these, the resin layer contains preferably triethylene glycol-di-2-ethylhexanoate, triethylene glycol-di-2-ethylbutyrate, or triethylene glycol-di-n-heptanoate, more preferably triethylene glycol-di-2-ethylhexanoate.

The plasticizer content is not particularly limited. Yet, the plasticizer content based on 100 parts by mass of the thermoplastic resin is preferably 25 parts by mass or more, more preferably 30 parts by mass or more, and preferably 80 parts by mass or less, more preferably 70 parts by mass or less. When the plasticizer content is equal to or more than the lower limit, a laminated glass to be obtained has higher penetration resistance. When the plasticizer content is equal to or less than the upper limit, an interlayer film has higher transparency.

The resin layer preferably contains an adhesion modifier. In particular, the resin layer to be in contact with a glass plate in production of a laminated glass preferably contains an adhesion modifier.

As the adhesion modifier, for example, an alkali metal salt or an alkaline earth metal salt is preferably used. Examples of the adhesion modifier include salts such as potassium, sodium, and magnesium salts.

Examples of an acid forming the salts include organic carboxylic acids such as octylic acid, hexylic acid, 2-ethylbutyric acid, butyric acid, acetic acid, and formic acid, and inorganic acids such as hydrochloric acid and nitric acid.

The resin layer to be in contact with a glass plate preferably contains magnesium salt as an adhesion modifier because the adhesion force between the glass plate and the resin layer can be easily adjusted in production of a laminated glass.

The resin layer may optionally contain additives such as an antioxidant, a light stabilizer, a modified silicone oil as an adhesion modifier, a flame retardant, an antistatic agent, a damp proofing agent, a heat ray reflecting agent, and a heat ray absorbing agent.

The thickness of the interlayer film for a laminated glass of the present invention is not particularly limited. The thickness of the interlayer film is preferably 0.1 mm or more, more preferably 0.25 mm or more, and preferably 3 mm or less, more preferably 1.5 mm or less, from a practical standpoint and from the viewpoint of sufficiently enhancing heat shielding properties. When the thickness of the interlayer film is equal to or more than the lower limit, a laminated glass to be obtained has high penetration resistance.

The interlayer film for a laminated glass of the present invention may be produced by any method. A conventionally known method can be employed in production of the interlayer film. For example, a thermoplastic resin and other optional components such as the component X to be contained are kneaded and molded into an interlayer film. Extrusion molding is suitable for continuous production and is therefore preferred for production of the interlayer film.

Preferably, the interlayer film for a laminated glass of the present invention includes, as two or more resin layers mentioned above, at least a first resin layer and a second resin layer, and polyvinyl acetal contained in the first resin layer (hereafter, referred to as polyvinyl acetal A) has a hydroxy group content different from that of polyvinyl acetal contained in the second resin layer (hereafter, referred to as polyvinyl acetal B).

Due to different characteristics of the polyvinyl acetal A and the polyvinyl acetal B, an interlayer film for a laminated glass to be provided can have various properties which are hardly achieved by a single layer structure. For example, in a case where the first resin layer is interposed between two second resin layers and the polyvinyl acetal A has a lower hydroxy group content than the polyvinyl acetal B, the first resin layer tends to have a lower glass transition temperature than the second resin layer. As a result, the first resin layer is softer than the second resin layer, leading to higher sound insulation properties of the interlayer film for a laminated glass. In a case where the first resin layer is interposed between two second resin layers and the polyvinyl acetal A has a higher hydroxy group content than the polyvinyl acetal B, the first resin layer tends to have a higher glass transition temperature than the second resin layer. As a result, the first resin layer is harder than the second resin layer, leading to higher penetration resistance of the interlayer film for a laminated glass.

In the case where the first resin layer and the second resin layer each contain a plasticizer, the plasticizer content (hereafter, referred to as content A) of the first resin layer based on 100 parts by mass of the polyvinyl acetal is preferably different from the plasticizer content (hereafter, referred to as content B) of the second resin layer based on 100 parts by mass of the polyvinyl acetal. For example, in a case where the first resin layer is interposed between two second resin layers and the content A is higher than the content B, the first resin layer tends to have a lower glass transition temperature than the second resin layer. As a result, the first resin layer is softer than the second resin layer, leading to higher sound insulation properties of the interlayer film for a laminated glass. In a case where the first resin layer is interposed between two second resin layers and the content A is lower than the content B, the first resin layer tends to have a higher glass transition temperature than the second resin layer. As a result, the first resin layer is harder than the second resin layer, leading to higher penetration resistance of the interlayer film for a laminated glass.

The combination of two or more resin layers included in the interlayer film for a laminated glass of the present invention may be, for example, a sound insulation layer as the first resin layer and a protective layer as the second resin layer with an aim of improving the sound insulation properties of a laminated glass to be obtained. For higher sound insulation properties of a laminated glass to be obtained, preferably, the sound insulation layer contains polyvinyl acetal X and a plasticizer, and the protective layer contains polyvinyl acetal Y and a plasticizer. Moreover, in a case where the sound insulation layer is interposed between two protective layers, the resulting interlayer film for a laminated glass (hereafter, also referred to as a sound insulation interlayer film) can have excellent sound insulation properties. The sound insulation interlayer film is more specifically described in the following.

In the sound insulation interlayer film, the sound insulation layer imparts sound insulation properties. The sound insulation layer preferably contains the polyvinyl acetal. X and a plasticizer.

The polyvinyl acetal X can be prepared by acetalization of polyvinyl alcohol with an aldehyde. The polyvinyl alcohol is commonly obtained by saponifying polyvinyl acetate.

The lower limit of the average degree of polymerization of the polyvinyl alcohol is preferably 200, and the upper limit thereof is preferably 5,000. When the polyvinyl alcohol has an average degree of polymerization of 200 or more, a sound insulation interlayer film to be obtained can have better penetration resistance. When the polyvinyl alcohol has an average degree of polymerization of 5,000 or less, formability of a sound insulation layer can be ensured. Concerning the average degree of polymerization of the polyvinyl alcohol, the lower limit is more preferably 500 and the upper limit is more preferably 4,000.

The average degree of polymerization of the polyvinyl alcohol is obtained by a method in conformity with JIS K6726 "Testing methods for polyvinyl alcohol".

The lower limit of the carbon number of the aldehyde used for acetalization of the polyvinyl alcohol is preferably 4, and the upper limit thereof is preferably 6. When the aldehyde has a carbon number of 4 or more, a sound insulation interlayer film for a laminated glass to be obtained can stably contain a sufficient amount of a plasticizer. As a result, the sound insulation interlayer film can exhibit excellent sound insulation properties. Moreover, bleeding out of the plasticizer can be prevented. When the aldehyde has a carbon number of 6 or less, synthesis of the polyvinyl acetal X can be facilitated, ensuring the productivity. The C4-C6 aldehyde may be a linear or branched aldehyde, and examples thereof include n-butyraldehyde and n-valeraldehyde.

The upper limit of the hydroxy group content of the polyvinyl acetal X is preferably 30 mol %. When the hydroxy group content of the polyvinyl acetal X is 30 mol % or lower, the sound insulation layer can contain a plasticizer in an amount needed for exhibiting sound insulation properties, and bleeding out of the plasticizer can be prevented. The upper limit of the hydroxy group content of the polyvinyl acetal X is more preferably 28 mol %, still more preferably 26 mol %, particularly preferably 24 mol %, and the lower limit thereof is preferably 10 mol %, more preferably 15 mol %, still more preferably 20 mol %. The hydroxy group content of the polyvinyl acetal X is a value in percentage of the mole fraction (mol %) obtained by dividing the amount of ethylene groups to which hydroxy groups are bonded by the total amount of ethylene groups of the main chain. The amount of ethylene groups to which hydroxy groups are bonded can be determined by measuring the amount of ethylene groups to which hydroxy groups are bonded in the polyvinyl acetal X by the method in conformity with JIS K6728 "Testing methods for polyvinyl butyral".

The lower limit of the acetal group content of the polyvinyl acetal X is preferably 60 mol %, and the upper limit thereof is preferably 85 mol %. When the polyvinyl acetal X has an acetal group content of 60 mol % or more, the sound insulation layer has higher hydrophobicity and can contain a plasticizer in an amount needed for exhibiting sound insulation properties. Moreover, bleeding out of the plasticizer and whitening can be prevented. When the polyvinyl acetal X has an acetal group content of 85 mol % or less, synthesis of the polyvinyl acetal X can be facilitated, ensuring the productivity. The lower limit of the acetal group content of the polyvinyl acetal X is more preferably 65 mol %, still more preferably 68 mol % or more.

The acetal group content can be obtained by measuring the amount of ethylene groups to which acetal groups are bonded in the polyvinyl acetal X by the method in conformity with JIS K6728 "Testing methods for polyvinyl butyral".

The lower limit of the acetyl group content of the polyvinyl acetal X is preferably 0.1 mol %, and the upper limit thereof is preferably 30 mol %. When the acetyl group content of the polyvinyl acetal X is 0.1 mol % or more, the sound insulation layer can contain a plasticizer in an amount needed for exhibiting sound insulation properties, and bleeding out of the plasticizer can be prevented. When the acetyl group content of the polyvinyl acetal X is 30 mol % or less, the sound insulation layer can have higher hydrophobicity, preventing whitening. The lower limit of the acetyl group content is more preferably 1 mol %, still more preferably 5 mol %, particularly preferably 8 mol %, and the upper limit thereof is more preferably 25 mol %, still more preferably 20 mol %. The acetyl group content is a value in percentage of the mole fraction (mol %) obtained by subtracting the amount of ethylene groups to which acetal groups are bonded and the amount of ethylene groups to which hydroxy groups are bonded from the total amount of ethylene groups of the main chain and then dividing the obtained value by the total amount of ethylene groups of the main chain.

The polyvinyl acetal X is preferably a polyvinyl acetal having an acetyl group content of 8 mol % or more or a polyvinyl acetal having an acetyl group content of less than 8 mol % and an acetal group content of 65 mol % or more because the sound insulation layer can readily contain a plasticizer in an amount needed for exhibiting sound insulation properties. Moreover, the polyvinyl acetal X is more preferably a polyvinyl acetal having an acetyl group content of 8 mol % or more or a polyvinyl acetal having an acetyl group content of less than 8 mol % and an acetal group content of 68 mol % or more.

The lower limit of the plasticizer content of the sound insulation layer based on 100 parts by mass of the polyvinyl acetal X is preferably 45 parts by mass, and the upper limit thereof is preferably 80 parts by mass. When the plasticizer content is 45 parts by mass or more, the sound insulation layer can exhibit high sound insulation properties. When the plasticizer content is 80 parts by mass or less, reduction in the transparency and adhesiveness of an interlayer film for a laminated glass to be obtained due to bleeding out of the plasticizer can be prevented. The lower limit of the plasticizer content is more preferably 50 parts by mass, still more preferably 55 parts by mass, and the upper limit thereof is more preferably 75 parts by mass, still more preferably 70 parts by mass.

In the case where the sound insulation layer has a rectangular cross-sectional shape in the thickness direction, the lower limit of the thickness is preferably 50 μm. Having a thickness of 50 μm or more, the sound insulation layer can exhibit enough sound insulation properties. The lower limit of the thickness of the sound insulation layer is more preferably 80 μm. The upper limit thereof is not particularly limited. In consideration of the thickness as an interlayer film for a laminated glass, the upper limit is preferably 300 μm.

The sound insulation layer may have one end and the other end on an opposite side of the one end, and may have a shape in which the thickness of the other end is greater than the thickness of the one end. The sound insulation layer preferably has a wedge portion in a cross-sectional shape in the thickness direction. In this case, the lower limit of the minimum thickness of the sound insulation layer is preferably 50 μm. Having the minimum thickness of 50 μm or more, the sound insulation layer can exhibit enough sound insulation properties. The lower limit of the minimum thickness of the sound insulation layer is more preferably 80 μm, still more preferably 100 μm. The upper limit of the maximum thickness of the sound insulation layer is not particularly limited. The upper limit is preferably 300 μm in consideration of the thickness as an interlayer film for a laminated glass. The upper limit of the maximum thickness of the sound insulation layer is more preferably 220 μm.

The protective layer prevents bleeding out of the plasticizer contained in a large amount in the sound insulation layer to prevent reduction in the adhesiveness between the interlayer film for a laminated glass and the glass plate, and imparts penetration resistance to the interlayer film for a laminated glass.

The protective layer preferably contains, for example, a plasticizer and the polyvinyl acetal Y, more preferably a plasticizer and the polyvinyl acetal Y having a higher hydroxy group content than the polyvinyl acetal X.

The polyvinyl acetal Y can be prepared by acetalization of polyvinyl alcohol with an aldehyde. The polyvinyl alcohol is commonly obtained by saponifying polyvinyl acetate.

The lower limit of the average degree of polymerization of the polyvinyl alcohol is preferably 200, and the upper limit thereof is preferably 5,000. When the polyvinyl alcohol has an average degree of polymerization of 200 or more, an interlayer film for a laminated glass to be obtained can have better penetration resistance. When the polyvinyl alcohol has an average degree of polymerization of 5,000 or less, formability of a protective layer can be ensured. Concerning the average degree of polymerization of the polyvinyl alcohol, the lower limit is more preferably 500 and the upper limit is more preferably 4,000.

The lower limit of the carbon number of the aldehyde used for acetalization of the polyvinyl alcohol is preferably 3, and the upper limit thereof is preferably 4. When the aldehyde has a carbon number of 3 or more, an interlayer film for a laminated glass to be obtained has higher penetration resistance. When the aldehyde has a carbon number of 4 or less, productivity of the polyvinyl acetal Y is improved.

The C3-C4 aldehyde may be a linear or branched aldehyde, and examples thereof include n-butyraldehyde.

The upper limit of the hydroxy group content of the polyvinyl acetal Y is preferably 33 mol %, and the lower limit thereof is preferably 28 mol %. When the polyvinyl acetal Y has a hydroxy group content of 33 mol % or lower, whitening of an interlayer film for a laminated glass to be obtained can be prevented. When the polyvinyl acetal Y has a hydroxy group content of 28 mol % or higher, an interlayer film for a laminated glass to be obtained has higher penetration resistance.

The lower limit of the acetal group content of the polyvinyl acetal Y is preferably 60 mol %, and the upper limit thereof is preferably 80 mol %. When the acetal group content is 60 mol % or more, a protective layer to be obtained can contain a plasticizer in an amount needed for exhibiting enough penetration resistance. When the acetal group content is 80 mol % or less, the adhesion force between the protective layer and the glass plate can be ensured. The lower limit of the acetal group content is more preferably 65 mol %, and the upper limit thereof is more preferably 69 mol %.

The upper limit of the acetyl group content of the polyvinyl acetal Y is preferably 7 mol %. When the polyvinyl acetal Y has an acetyl group content of 7 mol % or less, a protective layer to be obtained can have higher hydrophobicity, thereby preventing whitening. The upper limit of the acetyl group content is more preferably 2 mol %, and the lower limit thereof is preferably 0.1 mol %. The hydroxy group contents, acetal group contents, and acetyl group contents of the polyvinyl acetals A, B, and Y can be measured by the same methods as those in the case of the polyvinyl acetal X.

The lower limit of the plasticizer content of the protective layer based on 100 parts by mass of the polyvinyl acetal Y is preferably 20 parts by mass, and the upper limit thereof is preferably 45 parts by mass. When the plasticizer content is 20 parts by mass or more, the penetration resistance can be ensured. When the plasticizer content is 45 parts by mass or less, bleeding out of the plasticizer can be prevented, thereby preventing reduction in the transparency and adhesiveness of an interlayer film for a laminated glass to be obtained. The lower limit of the plasticizer content is more preferably 30 parts by mass, still more preferably 35 parts by mass, and the upper limit thereof is more preferably 43 parts by mass, still more preferably 41 parts by mass. For better sound insulation properties of a laminated glass to be obtained, the plasticizer content of the protective layer is preferably lower than the plasticizer content of the sound insulation layer.

For higher sound insulation properties of a laminated glass to be obtained, the hydroxy group content of the polyvinyl acetal Y is preferably higher than the hydroxy group content of the polyvinyl acetal X, more preferably higher by 1 mol % or more, still more preferably higher by 5 mol % or more, particularly preferably higher by 8 mol % or more. Adjustment of the hydroxy group contents of the polyvinyl acetal X and polyvinyl acetal Y enables control of the plasticizer contents of the sound insulation layer and the protective layer, so that the sound insulation layer has a lower glass transition temperature. As a result, a laminated glass to be obtained has higher sound insulation properties.

For still higher sound insulation properties of a laminated glass to be obtained, the plasticizer content of the sound insulation layer (hereafter, also referred to as content X) based on 100 parts by mass of the polyvinyl acetal X is preferably higher than the plasticizer content of the protective layer (hereafter, also referred to as content Y) based on 100 parts by mass of the polyvinyl acetal Y, more preferably higher by 5 parts by mass or more, still more preferably higher by 15 parts by mass or more, particularly preferably higher by 20 parts by mass or more. Adjustment of the content X and content Y lowers the glass transition temperature of the sound insulation layer. As a result, a laminated glass to be obtained has still higher sound insulation properties.

The protective layer may have any thickness, provided that it can fulfill the role as the protective layer. In a case where protrusions and recesses are formed on the protective layer, the protective layer is preferably as thick as possible to prevent the protrusions and recesses from being transferred to the interface with the sound insulation layer directly in contact with the protective layer. Specifically, the lower limit of the thickness of the protective layer having a rectangular cross-sectional shape is preferably 100 µm, more preferably 200 µm, still more preferably 300 µm, particularly preferably 400 µm, most preferably 450 µm. The upper limit of the thickness of the protective layer is not particularly limited. In order to ensure the thickness of the sound insulation layer enough to achieve sufficient sound insulation properties, the upper limit of the protective layer is practically about 500 µm.

The protective layer may have one end and the other end on an opposite side of the one end, and may have a shape in which the thickness of the other end is greater than the thickness of the one end. The protective layer preferably has a wedge portion in a cross-sectional shape in the thickness direction. The protective layer may have any thickness, provided that it can fulfill the role as the protective layer. In a case where protrusions and recesses are formed on the protective layer, the protective layer is preferably as thick as possible to prevent the protrusions and recesses from being transferred to the interface with the sound insulation layer directly in contact with the protective layer. Specifically, the lower limit of the minimum thickness of the protective layer is preferably 100 µm, more preferably 300 µm, still more preferably 400 µm, particularly preferably 450 µm. The upper limit of the maximum thickness of the protective layer is not particularly limited. In order to ensure the thickness of the sound insulation layer enough to achieve sufficient sound insulation properties, the upper limit of the protective layer is practically about 1,000 µm, preferably 800 µm.

The interlayer film for a laminated glass of the present invention may have one end and the other end on an opposite side of the one end. The one end and the other end are end portions on both sides facing each other in the interlayer film. In the interlayer film for a laminated glass of the present invention, the thickness of the other end is preferably greater than the thickness of the one end. A laminated glass prepared using the interlayer film for a laminated glass of the present invention having such a shape where the thickness is different between one end and the other end can be suitably used in a head-up display. In this case, occurrence of double images can be effectively suppressed. The interlayer film for a laminated glass of the present invention may have a wedge cross-sectional shape. Provided that the interlayer film for a laminated glass has a wedge cross-sectional shape, a head-up display can perform image display without occurrence of double images by adjusting wedge angle θ of the wedge shape according to the mounting angle of the laminated glass. The lower limit of the wedge angle θ is preferably 0.1 mrad, more preferably 0.2 mrad, still more preferably 0.3 mrad, and the upper limit thereof is preferably 1 mrad, more preferably 0.9 mrad, from the viewpoint of further suppressing the occurrence of double images. In the case of producing the interlayer film for a laminated glass having a wedge cross-sectional shape, for example, by extrusion molding of a resin composition using an extruder, the produced interlayer film may have a shape having the minimum thickness in a region slightly inward from the end on the thinner side (specifically, when the distance from one end to the other end is defined as X, a region within a distance of 0X to 0.2X inward from the end on the thinner side) and having the maximum thickness in a region slightly inward from the end on the thicker side (specifically, when the distance from one end to the other end is defined as X, a region within a distance of 0X to 0.2X inward from the end on the thicker side). Such a shape is herein also included in the wedge shape.

The sound insulation interlayer film may be produced by any method. The sound insulation interlayer film can be produced, for example, by a method of forming the sound insulation layer and protective layer as sheet materials by a conventional film-forming method such as extrusion, calendering, or pressing and then stacking the obtained sheet materials.

The present invention also encompasses a laminated glass including the interlayer film for a laminated glass of the present invention interposed between a pair of glass plates.

The glass plate may be a commonly used transparent glass plate. Examples thereof include inorganic glass plates such as float glass plates, polished glass plates, figured glass plates, meshed glass plates, wired glass plates, colored glass plates, heat-absorbing glass plates, heat-reflecting glass plates, and green glass plates. An ultraviolet shielding glass plate including an ultraviolet shielding coat layer on a glass surface may also be used. Moreover, also usable are organic plastic plates made of polyethylene terephthalate, polycarbonate, polyacrylate, or the like.

The glass plates may include two or more types of glass plates. For example, the laminated glass may be a laminated glass including the interlayer film for a laminated glass of the present invention between a transparent float glass plate and a colored glass plate such as a green glass plate. The glass plates may include two or more glass plates with different thicknesses.

Advantageous Effects of Invention

The present invention can provide an interlayer film for a laminated glass which is easily peelable without autohesion even after storage in a stacked state, a laminated glass prepared using the interlayer film for a laminated glass, and a method for producing the interlayer film for a laminated glass.

DESCRIPTION OF EMBODIMENTS

Figure 1:
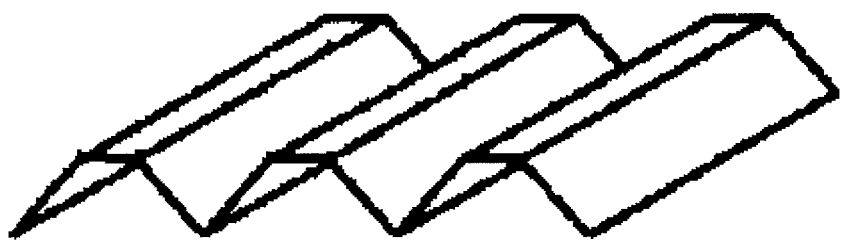
FIG. 1 shows a schematic view of an exemplary interlayer film for a laminated glass, having recesses on a surface, in which the recesses each having a groove shape with a continuous bottom are adjacent and parallel to each other at equal intervals.
Figure 2:
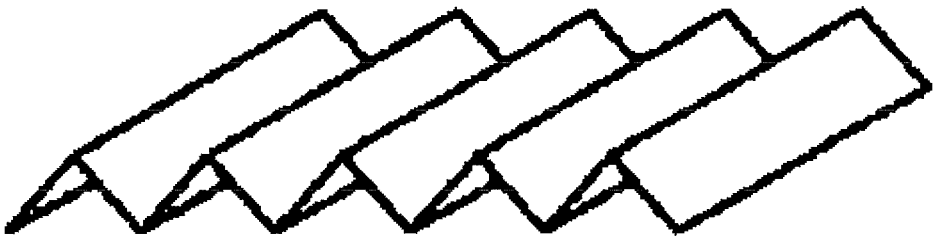
FIG. 2 shows a schematic view of an exemplary interlayer film for a laminated glass, having recesses on a surface, in which the recesses each having a groove shape with a continuous bottom are adjacent and parallel to each other at equal intervals.
Figure 3:
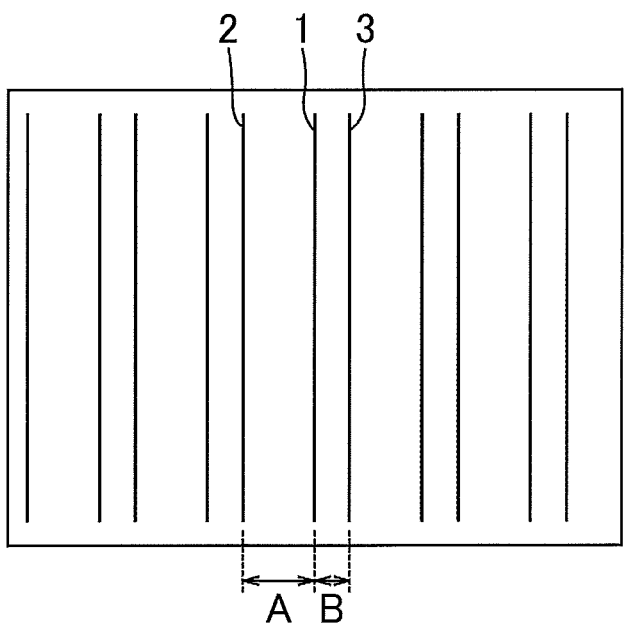
FIG. 3 shows a schematic view of an exemplary interlayer film for a laminated glass, having recesses on a surface, in which the recesses each having a groove shape with a continuous bottom are adjacent and parallel to each other at unequal intervals.
Figure 4:
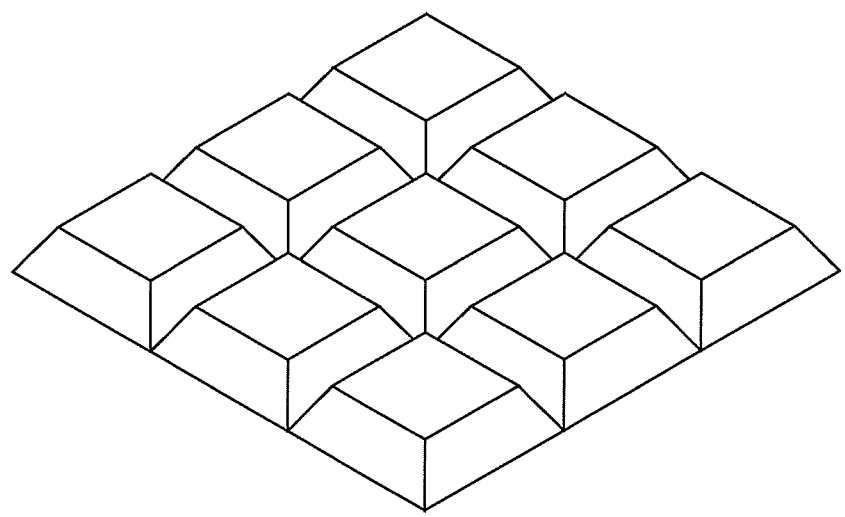
FIG. 4 shows a schematic view of an exemplary interlayer film for a laminated glass, having a blockish pattern on a surface.
Figure 5:
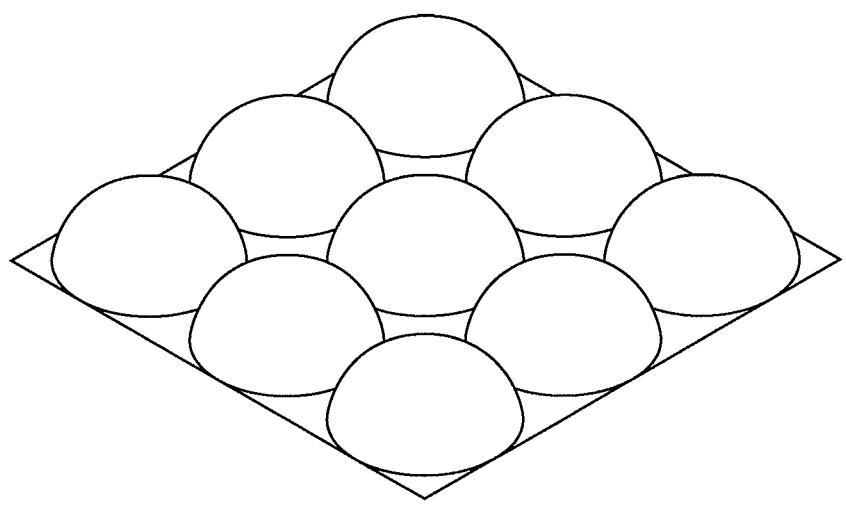
FIG. 5 shows a schematic view of an exemplary interlayer film for a laminated glass, having a spherical pattern on a surface.
Figure 6:
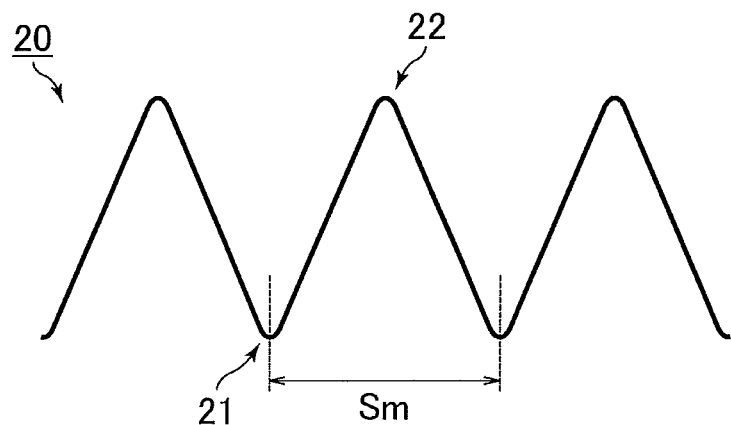
FIG. 6 shows schematic views explaining an interval Sm between recesses and a radius of rotation R of a protrusion.
Figure 6:
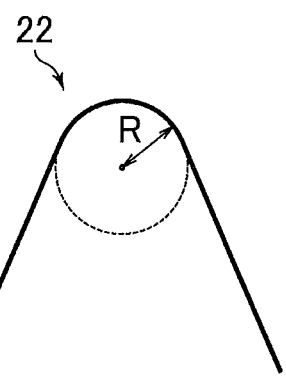
Figure 7:
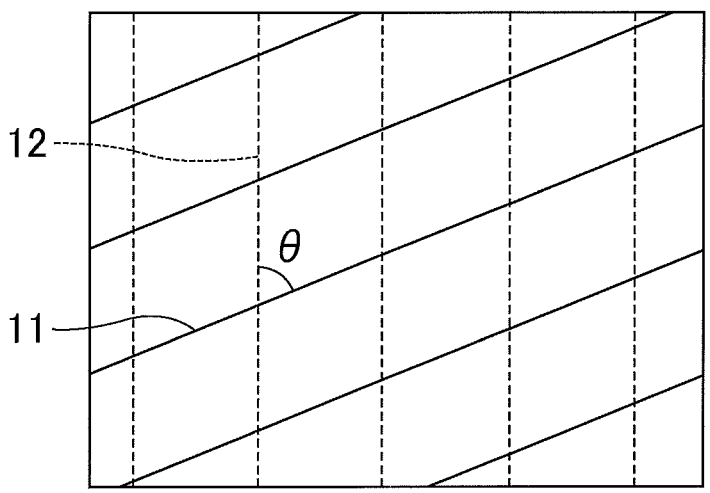
FIG. 7 shows a schematic view explaining an intersection angle θ.

Embodiments of the present invention are more specifically described in the following with reference to, but not limited to, examples.

Example 1

(1) Preparation of a Resin Composition

Polyvinyl alcohol having an average degree of polymerization of 1,700 was acetalized with n-butyraldehyde to give polyvinyl butyral (acetyl group content: 1 mol %, butyral group content: 69.1 mol %, hydroxy group content: 30 mol %). To 100 parts by mass of the polyvinyl butyral was added 40 parts by mass of triethylene glycol-di-2-ethylhexanoate (3GO) as a plasticizer, and kneaded well with a mixing roll to give a resin composition.

(2) Production of an Interlayer Film for a Laminated Glass

The obtained resin composition was extruded from an extruder into an interlayer film for a laminated glass having a uniform thickness.

(3) Formation of First Shape

In accordance with Production Example 1, the first shape was formed on both surfaces (a first surface and a second surface) of the interlayer film for a laminated glass.

Here, an embossing roll produced by the following method was used.

First, in the embossing roll production step 1, a surface of the metal roll was blasted with an abrasive material (#36) made of aluminum oxide at a discharge pressure of $50 \times 10^4$ Pa. The surface of the roll after the embossing roll production step 1 had a ten-point average roughness Rz of 65 μm as measured in conformity with JIS B 0601 (1994).

Next, in the embossing roll production step 2, partial grinding was performed with a grinding stone (#400 to 1000). The surface of the roll after the embossing roll production step 1 had a ten-point average roughness Rz of 40 μm as measured in conformity with JIS B 0601 (1994).

Next, in the embossing roll production step 3, blasting was performed with an abrasive material (#320) made of aluminum oxide at a discharge pressure of $50 \times 10^4$ Pa.

The obtained embossing rolls were paired up and used as a device for transferring a pattern of protrusions and recesses to form the first shape on both surfaces of the obtained interlayer film for a laminated glass. The transferring conditions were adjusted as follows to obtain desired roughness: a temperature of the interlayer film for a laminated glass of 80° C., a temperature of the rolls of 145° C., a linear velocity of 10 m/min, a line width of 1.5 m, and a linear pressure of 1 to 100 kN/m. The obtained interlayer film for a laminated glass had a thickness of 760 μm.

(4) Measurement of Protrusions and Recesses on a First Surface and a Second Surface (4-1) Sa Value Measurement The surface of the interlayer film for a laminated glass was measured using a three-dimensional white light interference microscope (ContourGT-K available from Bruker AXS GmbH) in a 1 mm square field of view at an objective lens magnification of 115 times, an internal lens magnification of 0.5 times, and a resolution set to Full resolution to obtain images. The obtained images were subjected to planarization and noise removal processes, and further subjected to Maskdata process to extract data on the heights of only the protrusions. Coarse protrusions and recesses were removed from the extracted data region using a Gaussian filter, and the arithmetical mean height Sa was calculated by the method specified in ISO 25178. Analytical software "Vision64" included in the apparatus was used in image processing. Conditions for the planarization and noise removal processes involved performing the first processing "Terms Removal (F-Operator)" on Analysis Toolbox under the analysis condition "Tilt only (Plane Fit)", performing the second processing "Statistic Filter" under the analysis conditions "Filter type: Sigma" and "Filter size: 5", and further performing the processing "data Restore" by selecting the analysis condition "Legacy", selecting Restore Edge condition, and setting Iteration condition to a value for sufficient data complement. In the third step "Mask data" to extract image data on only the protrusions, the Height threshold of a histogram displayed under the analysis condition Histogram Mask was determined to be between 0.2 and −0.2 μm, and data on height regions equal to or more than the threshold was extracted under the condition "Mask: Left". In order to remove coarse protrusions and recesses, the fourth processing "Gaussian Regression Filter" was performed under the analysis conditions "Short wavelength pass, order: 2, Type: Regular, and Long wavelength cutoff: 0.025 mm", and advance setup was performed under initial conditions. The image data after the first processing through the third processing was subjected to the fourth processing "S parameters-height" under the analysis condition "Removal tilt: True". The resulting "Sa" was used as the arithmetical mean height Sa value. Nine points in a 10 cm square of the interlayer film for a laminated glass were measured such that these points were 3 cm or more distant from each other. The average of the measurement values is used as the Sa value.

(4-2) Rz Value Measurement

The ten-point average roughness (Rz) on both surfaces of the obtained interlayer film was measured by the method in conformity with JIS B-0601 (1994). The measuring instrument used was "Surfcorder SE300" available from Kosaka Laboratory Ltd. The measurement was performed using a stylus profilometer at a cut-off value of 2.5 mm, a standard length of 2.5 mm, an evaluation length of 12.5 mm, and a measurement rate of 0.5 mm/s, with a stylus having a tip radius of 2 μm and a tip angle of 60°. The stylus was moved in a direction parallel to the direction of sheet flow.

Examples 2 and 3 and Comparative Examples 1 and 2

An interlayer film for a laminated glass was produced in the same manner as in Example 1 except the followings: a different type of the blasting agent was used in the embossing roll production step 3 to produce an embossing roll for forming the first shape; and the pressure of the press for transferring a pattern of protrusions and recesses was adjusted to obtain a desired Rz value. Then, the protrusions and recesses on both surfaces of the interlayer film were measured.

Example 4

(1) Preparation of a Resin Composition

Polyvinyl alcohol having an average degree of polymerization of 1,700 was acetalized with n-butyraldehyde to give polyvinyl butyral (acetyl group content: 1 mol %, butyral group content: 69.1 mol %, hydroxy group content: 30 mol %). To 100 parts by mass of the polyvinyl butyral were added 40 parts by mass of triethylene glycol-di-2-ethylhexanoate (3GO) as a plasticizer, and kneaded well with a mixing roll to give a resin composition.

(2) Production of an Interlayer Film for a Laminated Glass

The obtained resin composition was extruded from an extruder into an interlayer film for a laminated glass having a uniform thickness.

(3) Formation of First Shape

The first shape was formed on a surface of the interlayer film for a laminated glass by the same method as in Example 3.

(4) Formation of Second Shape

Protrusions and recesses each having a groove shape with a continuous bottom were formed by the following procedure on the interlayer film for a laminated glass on which the first shape was formed. A pair of rolls including a metal roll having a surface milled with a triangular oblique line-type mill and a rubber roll having a JIS hardness of 45 to 75 was used as a device for transferring a pattern of protrusions and recesses. The interlayer film for a laminated glass having the first shape was passed through the device for transferring a pattern of protrusions and recesses, thereby forming protrusions and recesses on a first surface of the interlayer film for a laminated glass. The recesses each having a groove shape with a continuous bottom were parallel to each other at equal intervals. The transferring conditions employed here were a temperature of the interlayer film for a laminated glass of 70° C., a temperature of the rolls of 140° C., a linear velocity of 10 m/min, and a linear pressure of 1 to 100 kN/m. Then, the same operation was performed on a second surface of the interlayer film for a laminated glass to form recesses each having a groove shape with a continuous bottom. Here, the intersection angle between the recesses each having a groove shape with a continuous bottom (shape of an engraved line) formed on the first surface and the recesses each having a groove shape with a continuous bottom (shape of an engraved line) formed on the second surface was adjusted to 20°. The obtained interlayer film for a laminated glass had a thickness of 760 μm.

(5) Measurement of Protrusions and Recesses on First Surface and Second Surface after Formation of Second Shape (5-1) Sa Value Measurement The surface of the interlayer film for a laminated glass was measured using a three-dimensional white light interference microscope (ContourGT-K available from Bruker AXS GmbH) in a 1 mm square field of view at an objective lens magnification of 115 times, an internal lens magnification of 0.5 times, and a resolution set to Full resolution to obtain images. The surface of the interlayer film for a laminated glass was measured using a three-dimensional white light interference microscope (ContourGT-K available from Bruker AXS GmbH) in a 1 mm square field of view at an objective lens magnification of 115 times, an internal lens magnification of 0.5 times, and a resolution set to Full resolution to obtain images. The obtained images were subjected to planarization and noise removal processes. Data on the heights of only the protrusions was further extracted by the Mask data processing. Coarse protrusions and recesses were removed from the extracted data region using a Gaussian filter. Then, the arithmetical mean height Sa value was calculated by a method specified by ISO 25178. Analytical software "Vision64" included in the apparatus was used in image processing. Conditions for the planarization and noise removal processes involved performing the first processing "Terms Removal (F-Operator)" on Analysis Toolbox under the analysis condition "Tilt only (Plane Fit)", performing the second processing "Statistic Filter" under the analysis conditions "Filter type: Sigma" and "Filter size: 5", and further performing the processing "data Restore" by selecting the analysis condition "Legacy", selecting Restore Edge condition, and setting Iteration condition to a value for sufficient data complement. In the third step "Mask data" to extract image data on only the protrusions, the Height threshold of a histogram displayed under the analysis condition Histogram Mask is determined to be between 0.2 and −0.2 μm, and data on height regions equal to or more than the threshold is extracted under the condition "Mask: Left". In order to remove coarse protrusions and recesses, the fourth processing "Gaussian Regression Filter" was performed under the analysis conditions "Short wavelength pass, order: 2, Type: Regular, and Long wavelength cutoff: 0.025 mm", and advance setup was performed under initial conditions. The image data after the first processing through the third processing was subjected to the fourth processing "S parameters-height" under the analysis condition "Removal tilt: True". The resulting "Sa" was used as the arithmetical mean height Sa value.

Nine points in a 10 cm square of the interlayer film for a laminated glass were measured such that these points were 3 cm or more distant from each other. The average of the measurement values was used as the Sa value.

(5-2) Apex Sa Value Measurement

The surface of the interlayer film for a laminated glass was measured using a three-dimensional white light interference microscope (ContourGT-K available from Bruker AXS GmbH) in a 1 mm square field of view at an objective lens magnification of 115 times, an internal lens magnification of 0.5 times, and a resolution set to Full resolution to obtain images. Analytical software "Vision64" included in the apparatus was used in image processing. Conditions for the planarization and noise removal processes involve performing the first processing "Terms Removal (F-Operator)" on Analysis Toolbox under the analysis condition "Tilt only (Plane Fit)", performing the second processing "Statistic Filter" under the analysis conditions "Filter type: Sigma" and "Filter size: 5", and further performing the processing "data Restore" by selecting the analysis condition "Legacy", selecting Restore Edge condition, and setting Iteration condition to a value for sufficient data complement. In the third step "Mask data" to extract image data on only the protrusions, the Height threshold of a histogram displayed under the analysis condition Histogram Mask was determined to be between 0.2 and −0.2 μm, and data on height regions equal to or more than the threshold is extracted under the condition "Mask: Left". In order to remove coarse protrusions and recesses, the fourth processing "Gaussian Regression Filter" was performed under the analysis conditions "Short wavelength pass, order: 2, Type: Regular, and Long wavelength cutoff: 0.025 mm", and advance setup was performed under initial conditions. The image data after the first processing through the third processing was subjected to the fourth processing "S parameters-height" under the analysis condition "Removal tilt: True". The resulting "Sa" was used as the arithmetical mean height Sa value. Nine points in a 10 cm square of the interlayer film for a laminated glass were measured such that these points were 3 cm or more distant from each other. The average of the measurement values was used as the Sa value.

(5-3) Rz Value Measurement

The ten-point average roughness (Rz) on both surfaces of the obtained interlayer film was measured by the method in conformity with JIS B 0601 (1994). The measurement instrument used was "Surfcorder SE300" available from Kosaka Laboratory Ltd. The measurement was performed using a stylus profilometer at a cut-off value of 2.5 mm, a standard length of 2.5 mm, an evaluation length of 12.5 mm, and a measurement rate of 0.5 mm/s, with a stylus having a tip radius of 2 μm and a tip angle of 60°. The measurement environment was 23° C. and 30 RH %. The stylus was moved in a direction perpendicular to the direction of the grooves in the shape of engraved lines.

(5-4) Sm Measurement

An optical microscope (e.g., DSX-100 available from Olympus Corporation) was used to observe the first surface and the second surface of the obtained interlayer film for a laminated glass (observation range: 4 mm×4 mm), and the interval between adjacent recesses was measured for every pair of adjacent recesses. Then, the shortest distances between deepest bottoms of adjacent recesses were averaged to determine the interval Sm of the recesses.

(5-5) Measurement of Radius of Rotation R of Protrusion

The interlayer film was cut in a direction perpendicular to the recesses in the shape of engraved lines and in the film thickness direction. The cross section was observed using a microscope (e.g., "DSX-100" available from Olympus Corporation) and photographed at a magnification of 277 times. The obtained image was enlarged to 50μ/20 mm. In this state, the radius of an inscribed circle at the apex of a protrusion shape was determined as the radius of rotation of the tip of the protrusion, using measurement software included in accessory software. Thus, the radius of rotation R of the protrusion was measured. The measurement environment was 23° C. and 30 RH %.

Examples 5 to 8

An interlayer film for a laminated glass was produced in the same manner as in Example 4 except the followings: a different type of the fine blasting agent as shown in Table 1 was used in the embossing roll production step 3 to produce an embossing roll for forming the first shape; the embossing shape and the pitch width for forming the second shape were changed as shown in Table 1; and the linear pressure for forming the second shape was adjusted to 1 to 100 kN/m to obtain desired roughness. Then, the protrusions and recesses on both surfaces of the interlayer film were measured.

(Evaluation)

The interlayer films for a laminated glass obtained in Examples 1 to 8 and Comparative Examples 1 and 2 were evaluated for autohesion by the following method. Table 1 shows the results.

The interlayer film for a laminated glass obtained in each of the examples and comparative examples was cut into a size of 150 mm in length and 150 mm in width to obtain a test specimen. Two test specimens thus obtained were stacked, and a glass plate (weight: 5.8 kg) was placed thereon with a release paper as a means of releasing treatment interposed therebetween. The release paper was prepared by silicone coating of a base paper. In this state, the test specimens were left for 48 hours in a constant temperature and humidity bath adjusted to a temperature of 30° C. and a humidity of 30%. Then, 2 cm end portions of the two test specimens were peeled from each other, and the end portions of the two test specimens were fixed with 15 cm wide grippers, respectively. The 180° peel strength between the two test specimens was measured in conformity with JIS K-6854-3 (1999) at a peel rate of 50 cm/min in an environment of a temperature of 23° C. and a humidity of 30%, and the average peel strength (N/15 cm) of a peeling distance from 50 mm to 200 mm was calculated. The other conditions conformed to JIS K-6854-3 (1994). The obtained value was used as the autohesion force of the interlayer film for a laminated glass.

For peeling by a machine transporting interlayer films for a laminated glass or by human power, the autohesion force is preferably 20 N/15 cm or less, more preferably 13 N/15 cm or less, still more preferably 10 N/15 cm or less.

TABLE 1

| | | | Example 1 | Example 2 | Example 3 | Example 4 | Example 5 | Example 6 |
|---|---|---|---|---|---|---|---|---|
| Composition of interlayer film | Polyvinyl butyral resin | Average degree of polymerization of PVA | 1700 | 1700 | 1700 | 1700 | 1700 | 1700 |
| | | Butyralation degree (mol %) | 69 | 69 | 69 | 69 | 69 | 69 |
| | | Acetylation degree (mol %) | 1 | 1 | 1 | 1 | 1 | 1 |
| | | Hydroxy group content (mol %) | 30 | 30 | 30 | 30 | 30 | 30 |
| | | Amount (parts by mass) | 100 | 100 | 100 | 100 | 100 | 100 |
| | Plasticizer | Type | 3GO | 3GO | 3GO | 3GO | 3GO | 3GO |
| | | Amount (parts by mass) | 40 | 40 | 40 | 40 | 40 | 40 |
| First shape | Formation method (Production Example 1) | Fine blast size (mesh) | #320 | #320 | #320 | #320 | #320 | #320 |
| | Pattern of protrusions and recesses on first surface | Sa (nm) | 490 | 467 | 284 | 284 | 284 | 284 |
| | | Rz (μm) | 24 | 21 | 15 | 15 | 15 | 15 |

TABLE 1-continued

|  |  |  |  |  |  |  |  |  |
|---|---|---|---|---|---|---|---|---|
|  | Pattern of protrusions and recesses on second surface | Sa (nm) | 520 | 460 | 286 | 286 | 286 | 286 |
|  |  | Rz (μm) | 23 | 21 | 16 | 16 | 16 | 16 |
| Second shape | Formation method | Embossing type (shape) | — | — | — | Engraved lines | Engraved lines | Engraved lines |
|  | Pattern of protrusions and recesses on first surface | Sa (nm) | — | — | — | 223 | 220 | 240 |
|  |  | Apex Sa (nm) | — | — | — | 265 | 266 | 265 |
|  |  | Rz (μm) | — | — | — | 40 | 33 | 35 |
|  |  | Sm (μm) | — | — | — | 300 | 180 | 184 |
|  |  | Radius of rotation R (μm) | — | — | — | 60 | 55 | 55 |
|  | Pattern of protrusions and recesses on second surface | Sa (nm) | — | — | — | 221 | 208 | 251 |
|  |  | Apex Sa (nm) | — | — | — | 255 | 269 | 274 |
|  |  | Rz (μm) | — | — | — | 40 | 33 | 34 |
|  |  | Sm (μm) | — | — | — | 300 | 175 | 180 |
|  |  | Radius of rotation R (μm) | — | — | — | 60 | 55 | 58 |
|  | Intersection angle (°) between engraved lines |  | — | — | — | 20 | 20 | 10 |
| Evaluation | Autohesion (N/15 cm) |  | 5.8 | 7.6 | 17.0 | 14.5 | 12.8 | 15.2 |

|  |  |  | Example 7 | Example 8 | Comparative Example 1 | Comparative Example 2 |
|---|---|---|---|---|---|---|
| Composition of interlayer film | Polyvinyl butyral resin | Average degree of polymerization of PVA | 1700 | 1700 | 1700 | 1700 |
|  |  | Butyralation degree (mol %) | 69 | 69 | 69 | 69 |
|  |  | Acetylation degree (mol %) | 1 | 1 | 1 | 1 |
|  |  | Hydroxy group content (mol %) | 30 | 30 | 30 | 30 |
|  |  | Amount (parts by mass) | 100 | 100 | 100 | 100 |
|  | Plasticizer | Type | 3GO | 3GO | 3GO | 3GO |
|  |  | Amount (parts by mass) | 40 | 40 | 40 | 40 |
| First shape | Formation method (Production Example 1) | Fine blast size (mesh) | #320 | #320 | #320 | #800 |
|  | Pattern of protrusions and recesses on first surface | Sa (nm) | 284 | 284 | 170 | 172 |
|  |  | Rz (μm) | 15 | 15 | 9 | 22 |
|  | Pattern of protrusions and recesses on second surface | Sa (nm) | 286 | 286 | 168 | 181 |
|  |  | Rz (μm) | 16 | 16 | 10 | 18 |
| Second shape | Formation method | Embossing type (shape) | Engraved lines | Engraved lines | — | — |
|  | Pattern of protrusions and recesses on first surface | Sa (nm) | 211 | 202 | — | — |
|  |  | Apex Sa (nm) | 265 | 266 | — | — |
|  |  | Rz (μm) | 33 | 33 | — | — |
|  |  | Sm (μm) | 183 | 190 | — | — |
|  |  | Radius of rotation R (μm) | 54 | 57 | — | — |
|  | Pattern of protrusions and recesses on second surface | Sa (nm) | 216 | 240 | — | — |
|  |  | Apex Sa (nm) | 269 | 260 | — | — |
|  |  | Rz (μm) | 33 | 30 | — | — |
|  |  | Sm (μm) | 181 | 177 | — | — |
|  |  | Radius of rotation R (μm) | 58 | 55 | — | — |
|  | Intersection angle (°) between engraved lines |  | 45 | 90 | — | — |
| Evaluation | Autohesion (N/15 cm) |  | 9.8 | 8.0 | 52.0 | 28.0 |

Example 9

(1) Preparation of a Resin Composition

Polyvinyl alcohol having an average degree of polymerization of 1,700 was acetalized with n-butyraldehyde to give polyvinyl butyral (acetyl group content: 1 mol %, butyral group content: 69.1 mol %, hydroxy group content: 30 mol %). To 100 parts by mass of the polyvinyl butyral were added 40 parts by mass of triethylene glycol-di-2-ethyl-hexanoate (3GO) as a plasticizer, and kneaded well with a mixing roll to give a resin composition.

(2) Production of an Interlayer Film for a Laminated Glass and Formation of First Shape While an interlayer film for a laminated glass was formed, the first shape was also formed in conformity with Production Example 2.

Specifically, while an interlayer film for a laminated glass was formed, the first shape was also formed in conformity with the embossing method in which melt fracture phenomena are controlled, under the following conditions: an extrusion amount per die width of 440 kg/hr·m, a temperature of the film surface immediately after being extruded from the die of 200° C., a resin pressure at the die inlet of 80 kgf/cm², and a water temperature in the water tank for cooling the film of 20° C. to 30° C. Here, the distance between the die and the surface of the cooling water tank was 50 mm.

The obtained interlayer film for a laminated glass had a thickness of 760 μm. The Sa value and the Rz value were measured by the same methods as in Example 1.

Examples 10 and 11 and Comparative Example 3

An interlayer film for a laminated glass was produced in the same manner as in Example 9, except that the distance between the die and the surface of the cooling water tank for forming the first shape was changed as shown in Table 2, and the protrusions and recesses on both surfaces of the interlayer film were measured.

Example 12

(1) Preparation of a Resin Composition

Polyvinyl alcohol having an average degree of polymerization of 1,700 was acetalized with n-butyraldehyde to give polyvinyl butyral (acetyl group content: 1 mol %, butyral group content: 69.1 mol %, hydroxy group content: 30 mol %). To 100 parts by mass of the polyvinyl butyral were added 40 parts by mass of triethylene glycol-di-2-ethylhexanoate (3GO) as a plasticizer, and kneaded well with a mixing roll to give a resin composition.

(2) Production of an Interlayer Film for a Laminated Glass and Formation of First Shape While an interlayer film for a laminated glass was formed, the first shape was also formed in conformity with Production Example 2.

An interlayer film for a laminated glass was produced in the same manner as in Example 9, except that the distance between the die and the surface of the cooling water tank was changed as shown in Table 2, and the first shape was formed on both surfaces of the interlayer film.

The obtained interlayer film for a laminated glass had a thickness of 760 μm. The Sa value and the Rz value were measured by the same methods as in Example 1.

(3) Formation of Second Shape

Protrusions and recesses each having a groove shape with a continuous bottom were formed by the following procedure on the interlayer film for a laminated glass on which the first shape was formed. A pair of rolls including a metal roll having a surface milled with a triangular oblique line-type mill and a rubber roll having a JIS hardness of 45 to 75 was used as a device for transferring a pattern of protrusions and recesses. The interlayer film for a laminated glass having the first shape was passed through the device for transferring a pattern of protrusions and recesses, thereby forming protrusions and recesses on a first surface of the interlayer film for a laminated glass. The recesses each having a groove shape with a continuous bottom were parallel to each other at equal intervals. The transferring conditions employed here were a temperature of the interlayer film for a laminated glass of 70° C., a temperature of the rolls of 140° C., a linear velocity of 10 m/min, and a linear pressure of 1 to 100 kN/m. Then, the same operation was performed on a second surface of the interlayer film for a laminated glass to form recesses each having a groove shape with a continuous bottom. Here, the intersection angle between the recesses each having a groove shape with a continuous bottom (shape of an engraved line) formed on the first surface and the recesses each having a groove shape with a continuous bottom (shape of an engraved line) formed on the second surface was adjusted to 20°.

After the formation of the second shape, the protrusions and recesses on the first surface and the second surface were measured by the same method as in Example 4.

Examples 13 to 16 and Comparative Examples 4 to 6

An interlayer film for a laminated glass was produced in the same manner as in Example 12 except the followings: the distance between the die and the surface of the cooling water tank for forming the first shape was changed as shown in Table 2; the embossing shape and the pitch width for forming the second shape were changed as shown in Table 2; and the linear pressure for forming the second shape was adjusted to 1 to 100 kN/m to obtain desired roughness. Then, the protrusions and recesses on both surfaces of the interlayer film were measured.

(Evaluation)

The interlayer films for a laminated glass obtained in Examples 9 to 16 and Comparative Examples 3 to 6 were evaluated for autohesion by the same method as in Example 1. Table 2 shows the results.

TABLE 2

| | | | Example 9 | Example 10 | Example 11 | Example 12 | Example 13 | Example 14 |
|---|---|---|---|---|---|---|---|---|
| Composition of interlayer film | Polyvinyl butyral resin | Average degree of polymerization of PVA | 1700 | 1700 | 1700 | 1700 | 1700 | 1700 |
| | | Butyralation degree (mol %) | 69 | 69 | 69 | 69 | 69 | 69 |
| | | Acetylation degree (mol %) | 1 | 1 | 1 | 1 | 1 | 1 |
| | | Hydroxy group content (mol %) | 30 | 30 | 30 | 30 | 30 | 30 |
| | | Amount (parts by mass) | 100 | 100 | 100 | 100 | 100 | 100 |
| | Plasticizer | Type | 3GO | 3GO | 3GO | 3GO | 3GO | 3GO |
| | | Amount (parts by mass) | 40 | 40 | 40 | 40 | 40 | 40 |
| First shape | Formation method (Production Example 2) | Distance between die and water surface (mm) | 50 | 100 | 200 | 100 | 50 | 200 |
| | Pattern of protrusions and recesses on first surface | Sa (nm) | 553 | 350 | 267 | 350 | 553 | 260 |
| | | Rz (μm) | 30 | 22 | 23 | 22 | 30 | 17 |

TABLE 2-continued

|  |  |  |  |  |  |  |  |  |
|---|---|---|---|---|---|---|---|---|
|  | Pattern of protrusions and recesses on second surface | Sa (nm) | 440 | 382 | 277 | 382 | 553 | 259 |
|  |  | Rz (μm) | 29 | 20 | 20 | 20 | 30 | 18 |
| Second shape | Formation method | Embossing type (shape) | — | — | — | Engraved lines | Engraved lines | Engraved lines |
|  | Pattern of protrusions and recesses on first surface | Sa (nm) | — | — | — | 302 | 400 | 208 |
|  |  | Apex Sa (nm) | — | — | — | 340 | 517 | 244 |
|  |  | Rz (μm) | — | — | — | 42 | 42 | 40 |
|  |  | Sm (μm) | — | — | — | 200 | 200 | 200 |
|  |  | Tip R (μm) | — | — | — | 62 | 65 | 70 |
|  | Pattern of protrusions and recesses on second surface | Sa (nm) | — | — | — | 303 | 404 | 200 |
|  |  | Apex Sa (nm) | — | — | — | 375 | 501 | 244 |
|  |  | Rz (μm) | — | — | — | 44 | 44 | 44 |
|  |  | Sm (μm) | — | — | — | 200 | 200 | 200 |
|  |  | Tip R (μm) | — | — | — | 61 | 65 | 68 |
|  | Intersection angle (°) between engraved lines |  | — | — | — | 20 | 20 | 90 |
| Evaluation | Autohesion (N/15 cm) |  | 7.8 | 11.0 | 16.0 | 8.5 | 5.7 | 6.0 |

|  |  |  | Example 15 | Example 16 | Comparative Example 3 | Comparative Example 4 | Comparative Example 5 | Comparative Example 6 |
|---|---|---|---|---|---|---|---|---|
| Composition of interlayer film | Polyvinyl butyral resin | Average degree of polymerization of PVA | 1700 | 1700 | 1700 | 1700 | 1700 | 1700 |
|  |  | Butyralation degree (mol %) | 69 | 69 | 69 | 69 | 69 | 69 |
|  |  | Acetylation degree (mol %) | 1 | 1 | 1 | 1 | 1 | 1 |
|  |  | Hydroxy group content (mol %) | 30 | 30 | 30 | 30 | 30 | 30 |
|  |  | Amount (parts by mass) | 100 | 100 | 100 | 100 | 100 | 100 |
|  | Plasticizer | Type | 3GO | 3GO | 3GO | 3GO | 3GO | 3GO |
|  |  | Amount (parts by mass) | 40 | 40 | 40 | 40 | 40 | 40 |
| First shape | Formation method (Production Example 2) | Distance between die and water surface (mm) | 200 | 50 | 300 | 300 | 300 | 300 |
|  | Pattern of protrusions and recesses on first surface | Sa (nm) | 260 | 543 | 145 | 145 | 145 | 145 |
|  |  | Rz (μm) | 17 | 17 | 20 | 20 | 20 | 20 |
|  | Pattern of protrusions and recesses on second surface | Sa (nm) | 259 | 560 | 136 | 136 | 136 | 136 |
|  |  | Rz (μm) | 18 | 21 | 20 | 20 | 20 | 20 |
| Second shape | Formation method | Embossing type (shape) | Spherical | Blockish | — | Engraved lines | Spherical | Blockish |
|  | Pattern of protrusions and recesses on first surface | Sa (nm) | 220 | 452 | — | 110 | 130 | 138 |
|  |  | Apex Sa (nm) | 222 | 540 | — | 138 | 132 | 136 |
|  |  | Rz (μm) | 33 | 38 | — | 40 | 33 | 38 |
|  |  | Sm (μm) | 500 | 500 | — | 200 | 500 | 500 |
|  |  | Tip R (μm) | — | — | — | 88 | — | — |
|  | Pattern of protrusions and recesses on second surface | Sa (nm) | 274 | 458 | — | 136 | 133 | 133 |
|  |  | Apex Sa (nm) | 250 | 582 | — | 134 | 133 | 138 |
|  |  | Rz (μm) | 34 | 40 | — | 44 | 34 | 40 |
|  |  | Sm (μm) | 499 | 501 | — | 204 | 499 | 501 |
|  |  | Tip R (μm) | — | — | — | 80 | — | — |
|  | Intersection angle (°) between engraved lines |  | — | — | — | 90 | — | 90 |
| Evaluation | Autohesion (N/15 cm) |  | 6.7 | 4.0 | 30.0 | 23.3 | 24.1 | 23.7 |

Examples 17 and 18

An interlayer film for a laminated glass was produced in the same manner as in Example 1 except the followings: polyvinyl butyral having a composition as shown in Table 3 was used; a different type of the blasting agent was used in the embossing roll production step 3 to produce an embossing roll for forming the first shape; and the pressure of the press for transferring a pattern of protrusions and recesses was adjusted to obtain a desired Rz value. Then, the protrusions and recesses on both surfaces of the interlayer film were measured.

Examples 19 to 21

An interlayer film for a laminated glass was produced in the same manner as in Example 4 except the followings: polyvinyl butyral having a composition as shown in Table 3 was used; a different type of the fine blasting agent as shown in Table 3 was used in the embossing roll production step 3 to produce an embossing roll for forming the first shape; the embossing shape and the pitch width for forming the second shape were changed as shown in Table 3; and the linear pressure for forming the second shape was adjusted to 1 to 100 kN/m to obtain desired roughness. Then, the protrusions and recesses on both surfaces of the interlayer film were measured.
(Evaluation)

The interlayer films for a laminated glass obtained in Examples 17 to 21 were evaluated for autohesion by the same method as in Example 1. Table 3 shows the results.

changed as shown in Table 4. Then, the protrusions and recesses on both surfaces of the interlayer film were measured.

Example 24

An interlayer film for a laminated glass was produced in the same manner as in Example 12 except the followings: polyvinyl butyral having a composition as shown in Table 4 was used; the distance between the die and the surface of the cooling water tank for forming the first shape was changed as shown in Table 4; the embossing shape and the pitch width for forming the second shape were changed as shown

TABLE 3

| | | | Example 17 | Example 18 | Example 19 | Example 20 | Example 21 |
|---|---|---|---|---|---|---|---|
| Composition of interlayer film | Polyvinyl butyral resin | Average degree of polymerization of PVA | 1700 | 1700 | 1700 | 1700 | 1700 |
| | | Butyralation degree (mol %) | 69.9 | 68.4 | 68.4 | 69.9 | 68.4 |
| | | Acetylation degree (mol %) | 1.2 | 0.7 | 0.7 | 1.2 | 0.7 |
| | | Hydroxy group content (mol %) | 29 | 30.9 | 30.9 | 29 | 30.9 |
| | | Amount (parts by mass) | 100 | 100 | 100 | 100 | 100 |
| | Plasticizer | Type | 3GO | 3GO | 3GO | 3GO | 3GO |
| | | Amount (parts by mass) | 40 | 40 | 40 | 40 | 40 |
| First shape | Formation method (Production Example 1) | Fine blast size (mesh) | #320 | #320 | #320 | #320 | #320 |
| | Pattern of protrusions and recesses on first surface | Sa (nm) | 490 | 501 | 501 | 290 | 285 |
| | | Rz (μm) | 24 | 25 | 25 | 16 | 16 |
| | Pattern of protrusions and recesses on second surface | Sa (nm) | 520 | 519 | 519 | 294 | 288 |
| | | Rz (μm) | 23 | 22 | 22 | 16 | 16 |
| Second shape | Formation method | Embossing type (shape) | — | — | Engraved lines | Engraved lines | Engraved lines |
| | Pattern of protrusions and recesses on first surface | Sa (nm) | — | — | 450 | 243 | 245 |
| | | Apex Sa (nm) | — | — | 500 | 270 | 266 |
| | | Rz (μm) | — | — | 35 | 39 | 38 |
| | | Sm (μm) | — | — | 195 | 200 | 198 |
| | | Radius of rotation R (μm) | — | — | 50 | 60 | 55 |
| | Pattern of protrusions and recesses on second surface | Sa (nm) | — | — | 440 | 221 | 240 |
| | | Apex Sa (nm) | — | — | 503 | 255 | 261 |
| | | Rz (μm) | — | — | 35 | 40 | 38 |
| | | Sm (μm) | — | — | 180 | 199 | 198 |
| | | Radius of rotation R (μm) | — | — | 50 | 60 | 50 |
| | | Intersection angle (°) between engraved lines | — | — | 20 | 90 | 90 |
| Evaluation | | Autohesion (N/15 cm) | 5.8 | 5.9 | 5.0 | 7.5 | 7.3 |

Examples 22 and 23

An interlayer film for a laminated glass was produced in the same manner as in Example 9 except the followings: polyvinyl butyral having a composition as shown in Table 4 was used; and the distance between the die and the surface of the cooling water tank for forming the first shape was in Table 4; and the linear pressure for forming the second shape was adjusted to 1 to 100 kN/m to obtain desired roughness. Then, the protrusions and recesses on both surfaces of the interlayer film were measured.
(Evaluation)

The interlayer films for a laminated glass obtained in Examples 22 to 24 were evaluated for autohesion by the same method as in Example 1. Table 4 shows the results.

TABLE 4

| | | | Example 22 | Example 23 | Example 24 |
|---|---|---|---|---|---|
| Composition of interlayer film | Polyvinyl butyral resin | Average degree of polymerization of PVA | 1700 | 1700 | 1700 |

TABLE 4-continued

|  |  |  | Example 22 | Example 23 | Example 24 |
|---|---|---|---|---|---|
|  |  | Butyralation degree (mol %) | 69.9 | 68.4 | 69.9 |
|  |  | Acetylation degree (mol %) | 1.2 | 0.7 | 1.2 |
|  |  | Hydroxy group content (mol %) | 29 | 30.9 | 29 |
|  |  | Amount (parts by mass) | 100 | 100 | 100 |
|  | Plasticizer | Type | 3GO | 3GO | 3GO |
|  |  | Amount (parts by mass) | 40 | 40 | 40 |
| First shape | Formation method (Production Example 2) | Distance between die and water surface (mm) | 50 | 50 | 200 |
|  | Pattern of protrusions and recesses on first surface | Sa (nm) | 553 | 588 | 260 |
|  |  | Rz (μm) | 37 | 40 | 17 |
|  | Pattern of protrusions and recesses on second surface | Sa (nm) | 483 | 570 | 259 |
|  |  | Rz (μm) | 38 | 42 | 18 |
| Second shape | Formation method | Embossing type (shape) | — | — | Engraved lines |
|  | Pattern of protrusions and recesses on first surface | Sa (nm) | — | — | 208 |
|  |  | Apex Sa (nm) | — | — | 244 |
|  |  | Rz (μm) | — | — | 40 |
|  |  | Sm (μm) | — | — | 200 |
|  |  | Tip R (μm) | — | — | 70 |
|  | Pattern of protrusions and recesses on second surface | Sa (nm) | — | — | 200 |
|  |  | Apex Sa (nm) | — | — | 244 |
|  |  | Rz (μm) | — | — | 44 |
|  |  | Sm (μm) | — | — | 200 |
|  |  | Tip R (μm) | — | — | 68 |
|  | Intersection angle (°) between engraved lines |  | — | — | 90 |
| Evaluation | Autohesion (N/15 cm) |  | 7.5 | 7.0 | 6.0 |

Example 25

(Preparation of a Resin Composition for a Protective Layer)

Polyvinyl alcohol having an average degree of polymerization of 1,700 was acetalized with n-butyraldehyde to give polyvinyl butyral (acetyl group content: 1 mol %, butyral group content: 69 mol %, hydroxy group content: 30 mol %). To 100 parts by mass of the polyvinyl butyral were added 36 parts by mass of triethylene glycol-di-2-ethylhexanoate (3GO) as a plasticizer, and kneaded well with a mixing roll to give a resin composition for protective layers.

(Preparation of a Resin Composition for an Intermediate Layer)

Polyvinyl alcohol having an average degree of polymerization of 3,000 was acetalized with n-butyraldehyde to give polyvinyl butyral (acetyl group content: 12.5 mol %, butyral group content: 64.2 mol %, hydroxy group content: 23.3 mol %). To 100 parts by mass of the polyvinyl butyral were added 76.5 parts by mass of triethylene glycol-di-2-ethylhexanoate (3GO) as a plasticizer, and kneaded well with a mixing roll to give a resin composition for intermediate layers.

(Production of an Interlayer Film for a Laminated Glass)

The obtained resin composition for intermediate layers and resin composition for protective layers were co-extruded using a co-extruder to form an interlayer film for a laminated glass having a triple layer structure including a first protective layer made of the resin composition for protective layers, an intermediate layer made of the resin composition for intermediate layers, and a second protective layer made of the resin composition for protective layers, stacked in the stated order. The extrusion conditions were set such that the first and second protective layers each had a thickness of 350 μm and the intermediate layer had a thickness of 100 μm in an interlayer film for a laminated glass to be obtained after formation of protrusions and recesses.

Subsequently, protrusions and recesses were formed on an interlayer film for a laminated glass in the same manner as in Example 1 except the followings: a different type of the blasting agent was used in the embossing roll production step 3 to produce an embossing roll for forming the first shape; and the pressure of the press for transferring a pattern of protrusions and recesses was adjusted to obtain a desired Rz value. Then, the protrusions and recesses on both surfaces of the interlayer film were measured.

Example 26 and Comparative Examples 7 and 8

An interlayer film for a laminated glass was produced in the same manner as in Example 25 except the followings: a different type of the blasting agent was used in the embossing roll production step 3 to produce an embossing roll for forming the first shape; and the pressure of the press for transferring a pattern of protrusions and recesses was adjusted to obtain a desired Rz value. Then, the protrusions and recesses on both surfaces of the interlayer film were measured.

Example 27

An interlayer film for a laminated glass was produced and the first shape was formed thereon in the same manner as in Example 25 except the followings: a different type of the blasting agent was used in the embossing roll production step 3 to produce an embossing roll for forming the first shape; and the pressure of the press for transferring a pattern of protrusions and recesses was adjusted to obtain a desired Rz value.

Protrusions and recesses each having a groove shape with a continuous bottom were formed by the following procedure on the interlayer film for a laminated glass on which the first shape was formed. A pair of rolls including a metal roll having a surface milled with a triangular oblique line-type mill and a rubber roll having a JIS hardness of 45 to 75 was used as a device for transferring a pattern of protrusions and recesses. The interlayer film for a laminated glass having the first shape was passed through the device for transferring a pattern of protrusions and recesses, thereby forming protrusions and recesses on a first surface of the interlayer film for a laminated glass. The recesses each having a groove shape with a continuous bottom were parallel to each other at equal intervals. The transferring conditions employed here were a temperature of the interlayer film for a laminated glass of 70° C., a temperature of the rolls of 140° C., a linear velocity of 10 m/min, and a linear pressure of 1 to 100 kN/m. Then, the same operation was performed on a second surface of the interlayer film for a laminated glass to form recesses each having a groove shape with a continuous bottom. Here, the intersection angle between the recesses each having a groove shape with a continuous bottom (shape of an engraved line) formed on the first surface and the recesses each having a groove shape with a continuous bottom (shape of an engraved line) formed on the second surface was adjusted to 20°.

Examples 28 to 33 and Comparative Example 9

An interlayer film for a laminated glass was produced in the same manner as in Example 27 except the followings: polyvinyl butyral having a composition as shown in Table 6 or 7 was used; a different type of the fine blasting agent as shown in Table 6 or 7 was used in the embossing roll production step 3 to produce an embossing roll for forming the first shape; the embossing shape and the pitch width for forming the second shape were changed as shown in Table 6 or 7; and the linear pressure for forming the second shape was adjusted to 1 to 100 kN/m to obtain desired roughness. Then, the protrusions and recesses on both surfaces of the interlayer film were measured.

(Evaluation)

The interlayer films for a laminated glass obtained in Examples 25 to 33 and Comparative Examples 7 to 9 were evaluated for autohesion by the same method as in Example 1. Tables 5 to 7 show the results.

TABLE 5

| | | | Example 25 | Example 26 | Example 27 | Example 28 |
|---|---|---|---|---|---|---|
| First and second protective layers | Polyvinyl butyral resin | Average degree of polymerization of PVA | 1700 | 1700 | 1700 | 1700 |
| | | Butyralation degree (mol %) | 69 | 69 | 69 | 69 |
| | | Acetylation degree (mol %) | 1 | 1 | 1 | 1 |
| | | Hydroxy group content (mol %) | 30 | 30 | 30 | 30 |
| | | Amount (parts by mass) | 100 | 100 | 100 | 100 |
| | Plasticizer | Type | 3GO | 3GO | 3GO | 3GO |
| | | Amount (parts by mass) | 36 | 36 | 36 | 36 |
| | Structure | Thickness (μm) | 350 | 350 | 350 | 350 |
| Intermediate layer | Polyvinyl butyral resin | Average degree of polymerization of PVA | 3000 | 3000 | 3000 | 3000 |
| | | Butyralation degree (mol %) | 64.2 | 64.2 | 64.2 | 64.2 |
| | | Acetylation degree (mol %) | 12.5 | 12.5 | 12.5 | 12.5 |
| | | Hydroxy group content (mol %) | 23.3 | 23.3 | 23.3 | 23.3 |
| | | Amount (parts by mass) | 100 | 100 | 100 | 100 |
| | Plasticizer | Type | 3GO | 3GO | 3GO | 3GO |
| | | Amount (parts by mass) | 76.5 | 76.5 | 76.5 | 76.5 |
| | Structure | Thickness (μm) | 100 | 100 | 100 | 100 |
| Interlayer film as a whole | Structure | Arrangement | First protective layer/ Intermediate layer/ Second protective layer | First protective layer/ Intermediate layer/ Second protective layer | First protective layer/ Intermediate layer/ Second protective layer | First protective layer/ Intermediate layer/ Second protective layer |
| | | Thickness (μm) | 800 | 800 | 800 | 800 |
| First shape | Formation method (Production Example 1) | Fine blast size (mesh) | #320 | #320 | #320 | #320 |
| | Pattern of protrusions and recesses on first surface | Sa (nm) | 480 | 450 | 290 | 290 |
| | | Rz (μm) | 23 | 20 | 16 | 16 |
| | Pattern of protrusions and recesses on second surface | Sa (nm) | 511 | 455 | 280 | 280 |
| | | Rz (μm) | 23 | 20 | 16 | 16 |

TABLE 5-continued

|  |  |  | Example 25 | Example 26 | Example 27 | Example 28 |
|---|---|---|---|---|---|---|
| Second shape | Formation method | Embossing type (shape) | — | — | Engraved lines | Engraved lines |
|  | Pattern of protrusions and recesses on first surface | Sa (nm) | — | — | 222 | 219 |
|  |  | Apex Sa (nm) | — | — | 270 | 270 |
|  |  | Rz (μm) | — | — | 41 | 34 |
|  |  | Sm (μm) | — | — | 299 | 182 |
|  |  | Radius of rotation R (μm) | — | — | 70 | 54 |
|  | Pattern of protrusions and recesses on second surface | Sa (nm) | — | — | 220 | 210 |
|  |  | Apex Sa (nm) | — | — | 260 | 270 |
|  |  | Rz (μm) | — | — | 40 | 34 |
|  |  | Sm (μm) | — | — | 299 | 178 |
|  |  | Radius of rotation R (μm) | — | — | 70 | 56 |
|  |  | Intersection angle (°) between engraved lines | — | — | 20 | 20 |
| Evaluation |  | Autohesion (N/15 cm) | 5.7 | 7.4 | 14.3 | 12.9 |

TABLE 6

|  |  |  | Example 29 | Example 30 | Example 31 | Example 32 |
|---|---|---|---|---|---|---|
| First and second protective layers | Polyvinyl butyral resin | Average degree of polymerization of PVA | 1700 | 1700 | 1700 | 1700 |
|  |  | Butyralation degree (mol %) | 69 | 69 | 69 | 69.9 |
|  |  | Acetylation degree (mol %) | 1 | 1 | 1 | 1.1 |
|  |  | Hydroxy group content (mol %) | 30 | 30 | 30 | 29 |
|  |  | Amount (parts by mass) | 100 | 100 | 100 | 100 |
|  | Plasticizer | Type | 3GO | 3GO | 3GO | 3GO |
|  |  | Amount (parts by mass) | 36 | 36 | 36 | 39 |
|  | Structure | Thickness (μm) | 350 | 350 | 350 | 350 |
| Intermediate layer | Polyvinyl butyral resin | Average degree of polymerization of PVA | 3000 | 2300 | 1700 | 2300 |
|  |  | Butyralation degree (mol %) | 64.2 | 64.2 | 64.2 | 77.8 |
|  |  | Acetylation degree (mol %) | 12.5 | 12.5 | 12.5 | 1.5 |
|  |  | Hydroxy group content (mol %) | 23.3 | 23.3 | 23.3 | 20.7 |
|  |  | Amount (parts by mass) | 100 | 100 | 100 | 100 |
|  | Plasticizer | Type | 3GO | 3GO | 3GO | 3GO |
|  |  | Amount (parts by mass) | 76.5 | 76.5 | 76.5 | 79 |
|  | Structure | Thickness (μm) | 100 | 100 | 100 | 100 |
| Interlayer film as a whole | Structure | Arrangement | First protective layer/ Intermediate layer/ Second protective layer | First protective layer/ Intermediate layer/ Second protective layer | First protective layer/ Intermediate layer/ Second protective layer | First protective layer/ Intermediate layer/ Second protective layer |
|  |  | Thickness (μm) | 800 | 800 | 800 | 800 |
| First shape | Formation method (Production Example 1) | Fine blast size (mesh) | #320 | #320 | #320 | #320 |
|  | Pattern of protrusions and recesses on first surface | Sa (nm) | 290 | 289 | 300 | 280 |
|  |  | Rz (μm) | 16 | 15 | 16 | 16 |
|  | Pattern of protrusions and recesses on second surface | Sa (nm) | 280 | 300 | 310 | 285 |
|  |  | Rz (μm) | 16 | 17 | 17 | 16 |
| Second shape | Formation method | Embossing type (shape) | Engraved lines | Engraved lines | Engraved lines | Engraved lines |
|  | Pattern of protrusions and recesses on first surface | Sa (nm) | 205 | 210 | 212 | 210 |
|  |  | Apex Sa (nm) | 283 | 290 | 303 | 290 |
|  |  | Rz (μm) | 34 | 34 | 35 | 34 |
|  |  | Sm (μm) | 190 | 195 | 198 | 191 |
|  |  | Radius of rotation R (μm) | 53 | 55 | 57 | 55 |
|  | Pattern of protrusions and recesses | Sa (nm) | 220 | 231 | 225 | 215 |
|  |  | Apex Sa (nm) | 278 | 301 | 299 | 280 |
|  |  | Rz (μm) | 33 | 35 | 32 | 35 |

TABLE 6-continued

|  |  |  | Example 29 | Example 30 | Example 31 | Example 32 |
|---|---|---|---|---|---|---|
|  | on second surface | Sm (μm) | 175 | 174 | 173 | 175 |
|  |  | Radius of rotation R (μm) | 55 | 60 | 60 | 60 |
|  |  | Intersection angle (°) between engraved lines | 90 | 90 | 90 | 90 |
| Evaluation |  | Autohesion (N/15 cm) | 7.8 | 7.9 | 7.8 | 7.7 |

TABLE 7

|  |  |  | Example 33 | Comparative Example 7 | Comparative Example 8 | Comparative Example 9 |
|---|---|---|---|---|---|---|
| First and second protective layers | Polyvinyl butyral resin | Average degree of polymerization of PVA | 1700 | 1700 | 1700 | 1700 |
|  |  | Butyralation degree (mol %) | 68.5 | 69 | 69 | 69 |
|  |  | Acetylation degree (mol %) | 0.5 | 1 | 1 | 1 |
|  |  | Hydroxy group content (mol %) | 31 | 30 | 30 | 30 |
|  |  | Amount (parts by mass) | 100 | 100 | 100 | 100 |
|  | Plasticizer | Type | 3GO | 3GO | 3GO | 3GO |
|  |  | Amount (parts by mass) | 36 | 36 | 36 | 36 |
|  | Structure | Thickness (μm) | 350 | 350 | 350 | 350 |
| Intermediate layer | Polyvinyl butyral resin | Average degree of polymerization of PVA | 1700 | 3000 | 3000 | 3000 |
|  |  | Butyralation degree (mol %) | 67 | 64.2 | 64.2 | 64.2 |
|  |  | Acetylation degree (mol %) | 8 | 12.5 | 12.5 | 12.5 |
|  |  | Hydroxy group content (mol %) | 25 | 23.3 | 23.3 | 23.3 |
|  |  | Amount (parts by mass) | 100 | 100 | 100 | 100 |
|  | Plasticizer | Type | 3GO | 3GO | 3GO | 3GO |
|  |  | Amount (parts by mass) | 75 | 76.5 | 76.5 | 76.5 |
|  | Structure | Thickness (μm) | 100 | 100 | 100 | 100 |
| Interlayer film as a whole | Structure | Arrangement | First protective layer/ Intermediate layer/ Second protective layer | First protective layer/ Intermediate layer/ Second protective layer | First protective layer/ Intermediate layer/ Second protective layer | First protective layer/ Intermediate layer/ Second protective layer |
|  |  | Thickness (μm) | 800 | 800 | 800 | 800 |
| First shape | Formation method (Production Example 1) | Fine blast size (mesh) | #320 | #320 | #800 | #800 |
|  | Pattern of protrusions and recesses on first surface | Sa (nm) | 282 | 160 | 150 | 175 |
|  |  | Rz (μm) | 16 | 9 | 22 | 23 |
|  | Pattern of protrusions and recesses on second surface | Sa (nm) | 290 | 155 | 187 | 150 |
|  |  | Rz (μm) | 16 | 10 | 19 | 16 |
| Second shape | Formation method | Embossing type (shape) | Engraved lines | — | — | Engraved lines |
|  | Pattern of protrusions and recesses on first surface | Sa (nm) | 205 | — | — | 130 |
|  |  | Apex Sa (nm) | 288 | — | — | 155 |
|  |  | Rz (μm) | 35 | — | — | 31 |
|  |  | Sm (μm) | 188 | — | — | 183 |
|  |  | Radius of rotation R (μm) | 52 | — | — | 55 |
|  | Pattern of protrusions and recesses on second surface | Sa (nm) | 208 | — | — | 134 |
|  |  | Apex Sa (nm) | 270 | — | — | 151 |
|  |  | Rz (μm) | 36 | — | — | 32 |
|  |  | Sm (μm) | 173 | — | — | 174 |
|  |  | Radius of rotation R (μm) | 52 | — | — | 60 |
|  |  | Intersection angle (°) between engraved lines | 90 | — | — | 20 |
| Evaluation |  | Autohesion (N/15 cm) | 7.5 | 53.1 | 29.0 | 25.0 |

Example 34

A resin composition for an intermediate layer and a resin composition for a protective layer were obtained in the same manner as in Example 25, except that polyvinyl butyral having a composition as shown in Table 8 was used. The obtained resin composition for an intermediate layer and the obtained resin composition for a protective layer were co-extruded from a co-extruder into an interlayer film for a laminated glass including three layers, i.e., a first protective layer formed from the resin composition for a protective layer, an intermediate layer formed from the resin composition for an intermediate layer, and a second protective layer formed from the resin composition for a protective layer, which were stacked in the stated order. While the interlayer film for a laminated glass was formed, the first shape was also formed in conformity with Production Example 2.

Specifically, while an interlayer film for a laminated glass was formed, the first shape was also formed in conformity with the embossing method in which melt fracture phenomena are controlled, under the following conditions: an extrusion amount per die width of 440 kg/hr·m, a temperature of the film surface immediately after being extruded from the die of 200° C., a resin pressure at the die inlet of 80 kgf/cm², and a water temperature in the water tank for cooling the film of 20° C. to 30° C. Here, the distance between the die and the surface of the cooling water tank was 100 mm.

In the obtained interlayer film for a laminated glass, the first protective layer and the second protective layer both had a thickness of 350 μm and the intermediate layer had a thickness of 100 μm. The Sa value and the Rz value were measured by the same methods as in Example 1.

Examples 35 and 36 and Comparative Example 10

An interlayer film for a laminated glass was produced in the same manner as in Example 34, except that the distance between the die and the surface of the cooling water tank for forming the first shape was changed as shown in Table 8, and the protrusions and recesses on both surfaces of the interlayer film were measured.

(Evaluation)

The interlayer films for a laminated glass obtained in Examples 34 to 36 and Comparative Example 10 were evaluated for autohesion by the same method as in Example 1. Table 8 shows the results.

TABLE 8

| | | | Example 34 | Example 35 | Example 36 | Comparative Example 10 |
|---|---|---|---|---|---|---|
| First and second protective layers | Polyvinyl butyral resin | Average degree of polymerization of PVA | 1700 | 1700 | 1700 | 1700 |
| | | Butyralation degree (mol %) | 69.9 | 68.5 | 68.5 | 69.9 |
| | | Acetylation degree (mol %) | 1.1 | 0.5 | 0.5 | 1.1 |
| | | Hydroxy group content (mol %) | 29 | 31 | 31 | 29 |
| | | Amount (parts by mass) | 100 | 100 | 100 | 100 |
| | Plasticizer | Type | 3GO | 3GO | 3GO | 3GO |
| | | Amount (parts by mass) | 39 | 36 | 36 | 39 |
| | Structure | Thickness (μm) | 350 | 350 | 350 | 350 |
| Intermediate layer | Polyvinyl butyral resin | Average degree of polymerization of PVA | 2300 | 2300 | 3000 | 2300 |
| | | Butyralation degree (mol %) | 77.8 | 67 | 67 | 77.8 |
| | | Acetylation degree (mol %) | 1.5 | 8 | 8 | 1.5 |
| | | Hydroxy group content (mol %) | 20.7 | 25 | 25 | 20.7 |
| | | Amount (parts by mass) | 100 | 100 | 100 | 100 |
| | Plasticizer | Type | 3GO | 3GO | 3GO | 3GO |
| | | Amount (parts by mass) | 79 | 75 | 75 | 79 |
| | Structure | Thickness (μm) | 100 | 100 | 100 | 100 |
| Interlayer film as a whole | Structure | Arrangement | First protective layer/ Intermediate layer/ Second protective layer | First protective layer/ Intermediate layer/ Second protective layer | First protective layer/ Intermediate layer/ Second protective layer | First protective layer/ Intermediate layer/ Second protective layer |
| | | Thickness (μm) | 800 | 800 | 800 | 800 |
| First shape | Formation method (Production Example 2) | Distance between die and water surface (mm) | 100 | 200 | 200 | 300 |
| | Pattern of protrusions and recesses on first surface | Sa (nm) | 388 | 278 | 295 | 140 |
| | | Rz (μm) | 25 | 23 | 23 | 18 |
| | Pattern of protrusions and recesses on second surface | Sa (nm) | 374 | 290 | 278 | 137 |
| | | Rz (μm) | 22 | 22 | 23 | 18 |

TABLE 8-continued

|  |  |  | Example 34 | Example 35 | Example 36 | Comparative Example 10 |
|---|---|---|---|---|---|---|
| Second shape | Formation method | Embossing type (shape) | — | — | — | — |
|  | Pattern of protrusions and recesses on first surface | Sa (nm) | — | — | — | — |
|  |  | Apex Sa (nm) | — | — | — | — |
|  |  | Rz (μm) | — | — | — | — |
|  |  | Sm (μm) | — | — | — | — |
|  |  | Tip R (μm) | — | — | — | — |
|  | Pattern of protrusions and recesses on second surface | Sa (nm) | — | — | — | — |
|  |  | Apex Sa (nm) | — | — | — | — |
|  |  | Rz (μm) | — | — | — | — |
|  |  | Sm (μm) | — | — | — | — |
|  |  | Tip R (μm) | — | — | — | — |
|  | Intersection angle (°) between engraved lines |  | — | — | — | — |
| Evaluation | Autohesion (N/15 cm) |  | 10.2 | 16.0 | 15.8 | 39.0 |

Example 37

(Production of an Interlayer Film for a Laminated Glass and Formation of First Shape)

While an interlayer film for a laminated glass was formed, the first shape was also formed in the same manner as in Example 34.

(Formation of Second Shape)

Protrusions and recesses each having a groove shape with a continuous bottom were formed by the following procedure on the interlayer film for a laminated glass on which the first shape was formed. A pair of rolls including a metal roll having a surface milled with a triangular oblique line-type mill and a rubber roll having a JIS hardness of 45 to 75 was used as a device for transferring a pattern of protrusions and recesses. The interlayer film for a laminated glass having the first shape was passed through the device for transferring a pattern of protrusions and recesses, thereby forming protrusions and recesses on a first surface of the interlayer film for a laminated glass. The recesses each having a groove shape with a continuous bottom were parallel to each other at equal intervals. The transferring conditions employed here were a temperature of the interlayer film for a laminated glass of 70° C., a temperature of the rolls of 140° C., a linear velocity of 10 m/min, and a linear pressure of 1 to 100 kN/m. Then, the same operation was performed on a second surface of the interlayer film for a laminated glass to form recesses each having a groove shape with a continuous bottom. Here, the intersection angle between the recesses each having a groove shape with a continuous bottom (shape of an engraved line) formed on the first surface and the recesses each having a groove shape with a continuous bottom (shape of an engraved line) formed on the second surface was adjusted to 20°. After the formation of the second shape, the protrusions and recesses on the first surface and the second surface were measured by the same method as in Example 4.

Example 38 and Comparative Example 11

An interlayer film for a laminated glass was produced in the same manner as in Example 37 except the followings: polyvinyl butyral having a composition as shown in Table 9 was used; the distance between the die and the surface of the cooling water tank for forming the first shape was changed as shown in Table 9; the embossing shape and the pitch width for forming the second shape were changed as shown in Table 9; and the linear pressure for forming the second shape was adjusted to 1 to 100 kN/m to obtain desired roughness. Then, the protrusions and recesses on both surfaces of the interlayer film were measured.

(Evaluation)

The interlayer films for a laminated glass obtained in Examples 37 and 38 and Comparative Example 11 were evaluated for autohesion by the same method as in Example 1. Table 9 shows the results.

TABLE 9

|  |  |  | Example 37 | Example 38 | Comparative Example 11 |
|---|---|---|---|---|---|
| First and second protective layers | Polyvinyl butyral resin | Average degree of polymerization of PVA | 1700 | 1700 | 1700 |
|  |  | Butyralation degree (mol %) | 69.9 | 68.5 | 68.5 |
|  |  | Acetylation degree (mol %) | 1.1 | 0.5 | 0.5 |
|  |  | Hydroxy group content (mol %) | 29 | 31 | 31 |
|  |  | Amount (parts by mass) | 100 | 100 | 100 |
|  | Plasticizer | Type | 3GO | 3GO | 3GO |
|  |  | Amount (parts by mass) | 39 | 36 | 36 |
|  | Structure | Thickness (μm) | 350 | 350 | 350 |
| Intermediate layer | Polyvinyl butyral resin | Average degree of polymerization of PVA | 2300 | 2300 | 1700 |
|  |  | Butyralation degree (mol %) | 77.8 | 67 | 67 |
|  |  | Acetylation degree (mol %) | 1.5 | 8 | 8 |

TABLE 9-continued

|  |  |  | Example 37 | Example 38 | Comparative Example 11 |
|---|---|---|---|---|---|
| Interlayer film as a whole | | Hydroxy group content (mol %) | 20.7 | 25 | 25 |
| | Plasticizer | Amount (parts by mass) | 100 | 100 | 100 |
| | | Type | 3GO | 3GO | 3GO |
| | | Amount (parts by mass) | 79 | 75 | 75 |
| | Structure | Thickness (μm) | 100 | 100 | 100 |
| | Structure | Arrangement | First protective layer/ Intermediate layer/Second protective layer | First protective layer/ Intermediate layer/Second protective layer | First protective layer/ Intermediate layer/Second protective layer |
| | | Thickness (μm) | 800 | 800 | 800 |
| First shape | Formation method (Production Example 2) | Distance between die and water surface (mm) | 100 | 200 | 300 |
| | Pattern of protrusions and recesses on first surface | Sa (nm) | 388 | 260 | 135 |
| | | Rz (μm) | 26 | 17 | 19 |
| | Pattern of protrusions and recesses on second surface | Sa (nm) | 374 | 259 | 133 |
| | | Rz (μm) | 22 | 18 | 18 |
| Second shape | Formation method | Embossing type (shape) | Engraved lines | Engraved lines | Engraved lines |
| | Pattern of protrusions and recesses on first surface | Sa (nm) | 320 | 209 | 98 |
| | | Apex Sa (nm) | 367 | 254 | 129 |
| | | Rz (μm) | 44 | 43 | 37 |
| | | Sm (μm) | 200 | 201 | 199 |
| | | Tip R (μm) | 60 | 70 | 88 |
| | Pattern of protrusions and recesses on second surface | Sa (nm) | 33 | 209 | 105 |
| | | Apex Sa (nm) | 380 | 250 | 133 |
| | | Rz (μm) | 44 | 43 | 41 |
| | | Sm (μm) | 200 | 200 | 180 |
| | | Tip R (μm) | 63 | 68 | 80 |
| | | Intersection angle (°) between engraved lines | 20 | 90 | 90 |
| Evaluation | | Autohesion (N/15 cm) | 8.8 | 6.5 | 28.0 |

INDUSTRIAL APPLICABILITY

The present invention provides an interlayer film for a laminated glass which is easily peelable without autohesion even after storage in a stacked state, a laminated glass prepared using the interlayer film for a laminated glass, and a method for producing the interlayer film for a laminated glass.

REFERENCE SIGNS LIST

1 arbitrarily selected one recess
2 recess adjacent to the arbitrarily selected one recess
3 recess adjacent to the arbitrarily selected one recess
A interval between the recess 1 and the recess 2
B interval between the recess 1 and the recess 3
10 interlayer film for a laminated glass
11 recess having a groove shape with a continuous bottom on a first surface
12 recess having a groove shape with a continuous bottom on a second surface
20 protrusions and recesses on a first surface or a second surface
21 recess having a groove shape with a continuous bottom
22 protrusion

The invention claimed is:

1. An interlayer film for a laminated glass, having a plurality of recesses on at least one surface,
   the at least one surface having the recesses has an arithmetical mean height Sa of 200 nm or more and 3,000 nm or less as measured in conformity with ISO 25178.

2. The interlayer film for a laminated glass according to claim 1,
   wherein the at least one surface having the recesses has an arithmetical mean height Sa of 250 nm or more and 3,000 nm or less as measured in conformity with ISO 25178.

3. The interlayer film for a laminated glass according to claim 1,
   wherein the plurality of recesses on the at least one surface each have a groove shape with a continuous bottom.

4. The interlayer film for a laminated glass according to claim 3,
   wherein the recesses each having a groove shape with a continuous bottom are regularly adjacent and parallel to each other.

5. The interlayer film for a laminated glass according to claim 3, further having a plurality of protrusions on the at least one surface having the recesses,
   wherein the surface has an arithmetical mean height Sa of 200 nm or more as measured for apexes of the protrusions in conformity with ISO 25178.

6. The interlayer film for a laminated glass according to claim 3, having a plurality of recesses on both surfaces,
    wherein the recesses on both surfaces each have a groove shape with a continuous bottom, and
    an intersection angle θ between the recesses each having a groove shape with a continuous bottom on one surface and the recesses each having a groove shape with a continuous bottom on the other surface is 10° or more.

7. The interlayer film for a laminated glass according to claim 3, further having a plurality of protrusions on each surface having the recesses,
    wherein the protrusions have a radius of rotation R of 200 μm or less.

8. The interlayer film for a laminated glass according to claim 1,
    wherein each surface having the recesses has a ten-point average roughness Rz of 10 μm or more as measured in conformity with JIS B 0601 (1994).

9. A laminated glass comprising:
    a pair of glass plates; and
    the interlayer film for a laminated glass according to claim 1 interposed between the pair of glass plates.

10. An interlayer film for a laminated glass, having a plurality of recesses and a plurality of protrusions on at least one surface,
    the plurality of recesses each having a groove shape with a continuous bottom,
    the at least one surface having the recesses has an arithmetical mean height Sa of 200 nm or more and 3,000 nm or less as measured in conformity with ISO 25178, and
    the at least one surface has an arithmetical mean height Sa of 200 nm or more as measured for apexes of the protrusions in conformity with ISO 25178.

11. A laminated glass comprising:
    a pair of glass plates; and
    the interlayer film for a laminated glass according to claim 10 interposed between the pair of glass plates.

12. A method for producing the interlayer film for a laminated glass according to claim 1, the method comprising the step of:
    forming a plurality of recesses on at least one surface of the interlayer film for a laminated glass by an embossing roll method using an embossing roll produced by a production process, the production process including:
    an embossing roll production step 1 of forming protrusions and recesses on a metal roll by blasting with an abrasive material,
    an embossing roll production step 2 of grinding a portion of each protrusion on the metal roll having the protrusions and recesses into a flat surface portion, and
    an embossing roll production step 3 of forming protrusions and recesses on the metal roll by blasting with an abrasive material finer than the abrasive material used in the embossing roll production step 1.

13. The method for producing the interlayer film for a laminated glass according to claim 12,
    wherein the abrasive material to be used in the embossing roll production step 3 has a grain diameter at a cumulative height of 3% in conformity with JIS R6001 (1998) of 150 μm or less, and a grain diameter at a cumulative height of 94% in conformity with JIS R6001 (1998) of 11 μm or more.

14. A method for producing the interlayer film for a laminated glass according to claim 1,
    the method being intended to form a plurality of recesses on at least one surface of the interlayer film for a laminated glass by an embossing method in which melt fracture phenomena are controlled, the method comprising the steps of:
    extruding a resin composition for forming an interlayer film for a laminated glass from a die; and
    cooling the extruded interlayer film for a laminated glass in a cooling water tank, a distance between the die and the cooling water tank being adjusted to 250 mm or less in the cooling.

* * * * *